United States Patent
Yao et al.

(10) Patent No.: US 12,456,281 B2
(45) Date of Patent: Oct. 28, 2025

(54) LAYOUT ANALYSIS METHOD AND ELECTRONIC DEVICE

(71) Applicant: Huawei Technologies Co., Ltd., Shenzhen (CN)

(72) Inventors: Hengzhi Yao, Shenzhen (CN); Liehang Shi, Shenzhen (CN); Zhiyuan Wang, Shanghai (CN); Letao Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 515 days.

(21) Appl. No.: 17/916,520

(22) PCT Filed: Apr. 8, 2021

(86) PCT No.: PCT/CN2021/085900
§ 371 (c)(1),
(2) Date: Sep. 30, 2022

(87) PCT Pub. No.: WO2021/204187
PCT Pub. Date: Oct. 14, 2021

(65) Prior Publication Data
US 2023/0154147 A1    May 18, 2023

(30) Foreign Application Priority Data
Apr. 8, 2020  (CN) .......................... 202010270092.0

(51) Int. Cl.
*G06V 10/82*  (2022.01)
*G06V 10/74*  (2022.01)

(52) U.S. Cl.
CPC ............ *G06V 10/761* (2022.01); *G06V 10/82* (2022.01)

(58) Field of Classification Search
CPC ................. G06V 10/761; G06V 10/82; G06F 2203/04808; G06F 3/04842;
(Continued)

(56) References Cited

U.S. PATENT DOCUMENTS

| | | |
|---|---|---|
| 10,095,380 B2 | 10/2018 | Moon et al. |
| 10,489,932 B2 | 11/2019 | Li et al. |

(Continued)

FOREIGN PATENT DOCUMENTS

| | | |
|---|---|---|
| CN | 103823849 A | 5/2014 |
| CN | 104423803 A | 3/2015 |

(Continued)

*Primary Examiner* — Charlotte M Baker
(74) *Attorney, Agent, or Firm* — Slater Matsil, LLP

(57) ABSTRACT

A device control method, apparatus, and system applicable to the field of smart home technologies. The method includes: recognizing a collected environmental image; determining at least one to-be-recognized region in the environmental image; monitoring a target body part movement in the to-be-recognized region; if it is monitored that the target body part movement is consistent with a preset activation movement, tracking and monitoring a target body part movement in a target to-be-recognized region; or if it is monitored that the target body part movement in the target to-be-recognized region is a preset control movement, controlling a terminal device to perform a function operation corresponding to the control movement. The terminal device is controlled by using a target body part movement including two-stage movements.

20 Claims, 15 Drawing Sheets

(58) Field of Classification Search
CPC .... G06F 3/04886; G06F 40/58; G06F 40/189;
G06F 3/0481; G06F 3/0488
USPC ........................................................ 382/100
See application file for complete search history.

(56) References Cited

U.S. PATENT DOCUMENTS

2015/0012840 A1    1/2015  Maldari et al.
2015/0146925 A1    5/2015  Son et al.
2016/0349968 A1*  12/2016  Daniel ............. G06V 30/18076

FOREIGN PATENT DOCUMENTS

| CN | 108595078 A | 9/2018 |
| CN | 109189290 A | 1/2019 |
| CN | 109829458 A | 5/2019 |
| CN | 110275667 A | 9/2019 |
| CN | 111626035 A | 9/2020 |

* cited by examiner

LAYOUT ANALYSIS METHOD AND ELECTRONIC DEVICE

CROSS-REFERENCE TO RELATED APPLICATIONS

This application is a national stage of International Application No. PCT/CN2021/085900, filed on Apr. 8, 2021, which claims priority to Chinese Patent Application No. 202010270092.0, filed on Apr. 8, 2020. Both of the aforementioned applications are hereby incorporated by reference in their entireties.

TECHNICAL FIELD

This application relates to intelligent recommendation and search technologies in the field of artificial intelligence (Artificial Intelligence, AI), and in particular, to a layout analysis method and an electronic device.

BACKGROUND

With continuous development of electronic technologies, performance of an electronic device such as a mobile phone or a tablet computer is gradually improved, and functions that can be provided by the electronic device are increasingly diversified. Layout analysis is one of the important functions. A HiTouch function of Huawei is used as an example. The electronic device may provide different services for a user based on different content displayed on a screen of the electronic device when the user triggers the HiTouch function, to achieve an objective of layout analysis. Specifically, an example in which an operation of triggering the HiTouch function is a two-finger pressing operation performed by the user on the screen of the electronic device is used. The electronic device may determine a pressing region based on a pressing position at which the user performs the two-finger pressing operation. When the user performs the two-finger pressing operation, if main content displayed in the pressing region is a text, it may be considered that the user wants to use an optical character recognition service. In this case, the electronic device provides the optical character recognition service in response to the operation of the user. If main content displayed in the pressing region is an image, it may be considered that the user wants to use a visual shopping service. In this case, the electronic device provides the visual shopping service in response to the operation of the user. If main content displayed in the pressing region is a QR code, it may be considered that the user wants to use a QR code recognition service. In this case, the electronic device provides the QR code recognition service in response to the operation of the user.

In the conventional technology, an electronic device may determine, based on a system component (view) corresponding to a pressing position at which a user performs a two-finger pressing operation, a service that the user wants to use, and further provide the corresponding service. For example, if the system component corresponding to the pressing position is a text component (textview), it may be determined that the service that the user wants to use is an optical character recognition service. For another example, if the system component corresponding to the pressing position is an image component (imageview), it may be determined that the service that the user wants to use is a visual shopping service.

However, in a case in which a nesting relationship exists between system components, a system component-based determining manner provided in the conventional technology may cause inconsistency between a service actually provided by an electronic device and a service that a user actually wants to use. For example, as shown in FIG. 1, an imageview is nested in a textview. The user uses two fingers to perform a two-finger pressing operation at pressing positions ① shown in FIG. 1. It can be seen that the two pressing positions ① are both on the textview. In this case, in the system component-based determining manner, the electronic device provides an optical character recognition service. However, main content in a pressing region (for example, a rectangular region including the two pressing positions ①) is an image. That is, the user may actually want to use a visual shopping service.

SUMMARY

Embodiments of this application provide a layout analysis method and an electronic device, to resolve a problem that after an operation of triggering layout analysis by a user is received, a system component-based determining manner of the electronic device may cause inconsistency between a service actually provided by the electronic device and a service that the user actually wants to use. This can provide the user with a layout analysis result that better meets a user requirement, thereby improving practicability and efficiency of layout analysis of the electronic device.

To achieve the foregoing objectives, the following technical solutions are used in embodiments of this application.

According to a first aspect of this application, a layout analysis method is provided. The method may include: receiving a first operation performed by a user on a touchscreen of an electronic device, where the first operation is used to trigger the electronic device to perform layout analysis; obtaining at least one region of interest (ROI) in response to the first operation; determining, based on content of a first interface currently displayed on the touchscreen of the electronic device, a type and location information of each to-be-matched region on the first interface; determining a degree of overlapping between the at least one ROI and each type of to-be-matched region based on the at least one ROI and the type and the location information of each to-be-matched region; determining a first service based on at least the degree of overlapping between the at least one ROI and each type of to-be-matched region, and running the first service; and displaying a second interface on the touchscreen of the electronic device, where the second interface includes a layout analysis result obtained after the first service is run, and the first service is an optical character recognition service, a visual shopping service, a text translation service, or a QR code recognition service.

In some embodiments, after the first service is determined, that is, a service that the user wants to use by triggering layout analysis is determined, the first service may not be run temporarily, but an interface is displayed. The interface includes a layout analysis service that can be provided, for example, includes the first service and a second service. In addition, on the interface, an identifier of the first service is displayed before an identifier of the second service (that is, the identifier of the first service and the identifier of the second service are displayed on the interface after being sorted, and the identifier of the first service is displayed before the identifier of the second service), or the identifier of the first service is highlighted, to prompt the user that the first service is recommended. Then, after the user selects the first service, the first service may be run, and the layout analysis result obtained after the first service is run may be further displayed.

According to this technical solution, after a user operation for triggering the electronic device to perform layout analysis is received, at least one ROI is obtained, and a type and location information of each region on a current display interface are determined based on content of the current display interface on a screen of the electronic device. Then, a degree of overlapping between the at least one ROI and each type of region may be determined based on the obtained at least one ROI and the type and the location information of each region on the current display interface. In this way, by using at least the determined degree of overlapping between the at least one ROI and each type of region, a service such as an optical character recognition service, a visual shopping service, a text translation service, or a QR code recognition service that the user specifically wants to use by triggering the electronic device to perform layout analysis may be determined, and the determined service is run, so that a layout analysis result obtained after the service is run is displayed on the touchscreen of the electronic device. According to the method provided in embodiments, a service that the user wants to use by triggering layout analysis is analyzed and determined based on the at least one ROI and the content of the current display interface on the screen of the electronic device, so that the electronic device can provide the user with a layout analysis result that better meets a user requirement, thereby improving practicability and efficiency of layout analysis of the electronic device.

In a possible implementation, the determining a first service based on at least the degree of overlapping between the at least one ROI and each type of to-be-matched region may include: determining the first service based on a historical operation record and the degree of overlapping between the at least one ROI and each type of to-be-matched region, where the historical operation record includes a second operation and a corresponding service selected by the user, and the second operation is an operation that is received before the first operation is received and that is used to trigger the electronic device to perform layout analysis. An intent of the user for triggering layout analysis this time is analyzed and determined by referring to the historical operation record of the user. This further improves layout analysis efficiency of the electronic device.

In another possible implementation, the electronic device stores a prediction model, the prediction model has a function of determining, based on a degree of overlapping between regions, a service that needs to be run, and the prediction model is updated based on the historical operation record. The determining the first service based on a historical operation record and the degree of overlapping between the at least one ROI and each type of to-be-matched region may include: The electronic device determines the first service by using the degree of overlapping between the at least one ROI and each type of to-be-matched region as an input of the prediction model.

In another possible implementation, the electronic device stores a prediction model, and the prediction model has a function of determining, based on a degree of overlapping between regions, a service that needs to be run. The determining a first service based on at least the degree of overlapping between the at least one ROI and each type of to-be-matched region may include: The electronic device determines the first service by using the degree of overlapping between the at least one ROI and each type of to-be-matched region as an input of the prediction model.

In another possible implementation, the ROI may include one or more of a first ROI, a second ROI, a third ROI, and a fourth ROI. The first ROI is a region including a pressing position of the first operation. The second ROI is a central region of the first interface. The third ROI is an entire region of the first interface. The fourth ROI is a region that accounts for a preset proportion of the first interface. After the first operation is received, a pressing habit of the user who inputs the operation cannot be learned of. Therefore, the foregoing plurality of ROIs may be obtained for subsequently predicting an actual region of interest of the user.

In another possible implementation, the region including the pressing position is a rectangular region.

In another possible implementation, the determining, based on content of a first interface currently displayed on the touchscreen of the electronic device, a type and location information of each to-be-matched region on the first interface may include: A server determines the type and the location information of each to-be-matched region on the first interface based on the content of the first interface by using a neural network algorithm or an image content detection algorithm. The server performs image analysis on the first interface based on the neural network algorithm or the image content detection algorithm, so that layout analysis efficiency can be further improved.

In another possible implementation, the type of the to-be-matched region may include one or more of the following types: a text region, an image region, or a QR code region.

In another possible implementation, the determining a degree of overlapping between the at least one ROI and each type of to-be-matched region based on the at least one ROI and the type and the location information of each to-be-matched region may include: determining a first intersection over union (IoU) of each to-be-matched region and the at least one ROI based on the location information of each to-be-matched region; and merging first IoUs of to-be-matched regions of a same type and the at least one ROI based on the type of each to-be-matched region, to obtain the degree of overlapping between the at least one ROI and each type of to-be-matched region. IoU is an area of an intersection set of two regions, or an area of a union set of two regions. The IoU can be used to measure a degree of overlapping between two regions. A larger IoU indicates a higher degree of overlapping between two regions. Therefore, an IoU of each to-be-matched region and the ROI is determined, so that a degree of overlapping between the to-be-matched region and the ROI may be determined and used as a basis for determining the actual region of interest of the user.

In another possible implementation, the determining a first intersection over union IoU of each to-be-matched region and the at least one ROI based on the location information of each to-be-matched region may include: determining a second IoU of each to-be-matched region and the at least one ROI based on the location information of each to-be-matched region; determining a distance between a center point of each to-be-matched region and a center point of the at least one ROI based on the location information of each to-be-matched region; normalizing the distance between the center point of each to-be-matched region and the center point of the at least one ROI, and obtaining an attenuation coefficient of each to-be-matched region based on a normalized distance; and for each to-be-matched region, performing attenuation processing on a second IoU of the to-be-matched region and the at least one ROI by using an attenuation coefficient of the to-be-matched region, to obtain the first IoU of each to-be-matched region and the at least one ROI. The actual region of interest of the user can be determined more accurately by attenuating the IoU (for example, the second IoU) of the to-be-matched region and the ROI.

In another possible implementation, after the displaying a second interface on the touchscreen of the electronic device, the method may further include: receiving an operation of choosing, by the user, to use the first service; and using the first service and the degree of overlapping between the at least one ROI and each type of to-be-matched region as a first training sample, and updating the prediction model by using the first training sample, so that the prediction model has a function of determining the first service based on the degree of overlapping between the at least one ROI and each type of to-be-matched region.

In another possible implementation, after the displaying a second interface on the touchscreen of the electronic device, the method may further include: receiving an operation of choosing, by the user, to use a second service, where the second service is the optical character recognition service, the visual shopping service, the text translation service, or the QR code recognition service, and the second service is different from the first service; and using the second service and the degree of overlapping between the at least one ROI and each type of to-be-matched region as a second training sample, and updating the prediction model by using the second training sample, so that the prediction model has a function of determining the second service based on the degree of overlapping between the at least one ROI and each type of to-be-matched region.

In embodiments, in a use process of the user, a usage habit of the user is collected, and the prediction model is updated based on the collected usage habit. In this way, the layout analysis result provided for the user further meets the user requirement.

In another possible implementation, the second interface further includes an identifier of the second service. The receiving an operation of choosing, by the user, to use a second service may include: receiving an operation performed by the user on the identifier of the second service.

According to a second aspect of this application, an electronic device is provided. The electronic device may include an input unit and a display unit. The display unit is configured to display a first interface. The input unit is configured to receive a first operation of a user. The first operation is used to trigger the electronic device to perform layout analysis. The display unit is further configured to display a second interface in response to the first operation. The second interface includes a layout analysis result obtained after a first service is run, and the first service is an optical character recognition service, a visual shopping service, a text translation service, or a QR code recognition service. The first service is determined based on a degree of overlapping between at least one region of interest ROI and each type of to-be-matched region, the degree of overlapping between the at least one ROI and each type of to-be-matched region is determined based on the at least one ROI and a type and location information of each to-be-matched region on the first interface, and the type and location information of each to-be-matched region on the first interface are determined based on content of the first interface.

In a possible implementation, the first service is specifically determined based on a historical operation record and the degree of overlapping between the at least one ROI and each type of to-be-matched region. The historical operation record includes a second operation and a corresponding service selected by the user, and the second operation is an operation that is received before the first operation is received and that is used to trigger the electronic device to perform layout analysis.

In another possible implementation, the electronic device further includes a storage unit and a determining unit. The storage unit is configured to store a prediction model. The prediction model has a function of determining, based on a degree of overlapping between regions, a service that needs to be run, and the prediction model is updated based on the historical operation record. The determining unit is configured to determine the first service by using the degree of overlapping between the at least one ROI and each type of to-be-matched region as an input of the prediction model.

In another possible implementation, the electronic device further includes a storage unit and a determining unit. The storage unit is configured to store a prediction model. The prediction model has a function of determining, based on a degree of overlapping between regions, a service that needs to be run. The determining unit is configured to determine the first service by using the degree of overlapping between the at least one ROI and each type of to-be-matched region as an input of the prediction model.

In another possible implementation, the ROI includes one or more of a first ROI, a second ROI, a third ROI, and a fourth ROI. The first ROI is a region including a pressing position of the first operation. The second ROI is a central region of the first interface. The third ROI is an entire region of the first interface. The fourth ROI is a region that accounts for a preset proportion of the first interface.

In another possible implementation, the region including the pressing position is a rectangular region.

In another possible implementation, the type and the location information of each to-be-matched region on the first interface are specifically determined by a server based on the content of the first interface by using a neural network algorithm or an image content detection algorithm.

In another possible implementation, the type of the to-be-matched region includes one or more of the following types: a text region, an image region, or a QR code region.

In another possible implementation, that the degree of overlapping between the at least one ROI and each type of to-be-matched region is determined based on the at least one ROI and a type and location information of each to-be-matched region on the first interface includes: determining a first intersection over union IoU of each to-be-matched region and the at least one ROI based on the location information of each to-be-matched region; and merging first IoUs of to-be-matched regions of a same type and the at least one ROI based on the type of each to-be-matched region, to obtain the degree of overlapping between the at least one ROI and each type of to-be-matched region.

In another possible implementation, the determining a first intersection over union IoU of each to-be-matched region and the at least one ROI based on the location information of each to-be-matched region includes: determining a second IoU of each to-be-matched region and the at least one ROI based on the location information of each to-be-matched region; determining a distance between a center point of each to-be-matched region and a center point of the at least one ROI based on the location information of each to-be-matched region; normalizing the distance between the center point of each to-be-matched region and the center point of the at least one ROI, and obtaining an attenuation coefficient of each to-be-matched region based on a normalized distance; and for each to-be-matched region, performing attenuation processing on a second IoU of the to-be-matched region and the at least one ROI by using an attenuation coefficient of the to-be-matched region, to obtain the first IoU of each to-be-matched region and the at least one ROI.

In another possible implementation, the electronic device further includes a model update unit. The input unit is further configured to receive an operation of choosing, by the user, to use the first service. The model update unit is configured to: use the first service and the degree of overlapping between the at least one ROI and each type of to-be-matched region as a first training sample, and update the prediction model by using the first training sample, so that the prediction model has a function of determining the first service based on the degree of overlapping between the at least one ROI and each type of to-be-matched region.

In another possible implementation, the electronic device further includes a model update unit. The input unit is further configured to receive an operation of choosing, by the user, to use a second service. The second service is the optical character recognition service, the visual shopping service, the text translation service, or the QR code recognition service, and the second service is different from the first service. The model update unit is configured to: use the second service and the degree of overlapping between the at least one ROI and each type of to-be-matched region as a second training sample, and update the prediction model by using the second training sample, so that the prediction model has a function of determining the second service based on the degree of overlapping between the at least one ROI and each type of to-be-matched region.

In another possible implementation, the second interface further includes an identifier of the second service. The input unit is specifically configured to receive an operation performed by the user on the identifier of the second service.

According to a third aspect of this application, an electronic device is provided. The electronic device includes a display, a memory, and one or more processors. The display and the memory are coupled to the processor. The display includes a touchscreen. The memory is configured to store computer program code. The computer program code includes computer instructions. When the processor executes the computer instructions, the electronic device is enabled to perform the following steps: The electronic device displays a first interface. The electronic device receives a first operation of a user. The first operation is used to trigger the electronic device to perform layout analysis. The electronic device displays a second interface in response to the first operation. The second interface includes a layout analysis result obtained after a first service is run, and the first service is an optical character recognition service, a visual shopping service, a text translation service, or a QR code recognition service. The first service is determined based on a degree of overlapping between at least one region of interest ROI and each type of to-be-matched region, the degree of overlapping between the at least one ROI and each type of to-be-matched region is determined based on the at least one ROI and a type and location information of each to-be-matched region on the first interface, and the type and location information of each to-be-matched region on the first interface are determined based on content of the first interface.

In a possible implementation, the first service is specifically determined based on a historical operation record and the degree of overlapping between the at least one ROI and each type of to-be-matched region. The historical operation record includes a second operation and a corresponding service selected by the user, and the second operation is an operation that is received before the first operation is received and that is used to trigger the electronic device to perform layout analysis.

In another possible implementation, the memory further stores a prediction mode. The prediction model has a function of determining, based on a degree of overlapping between regions, a service that needs to be run, and the prediction model is updated based on the historical operation record. The electronic device determines the first service by using the degree of overlapping between the at least one ROI and each type of to-be-matched region as an input of the prediction model.

In another possible implementation, the memory further stores a prediction mode. The prediction model has a function of determining, based on a degree of overlapping between regions, a service that needs to be run. The electronic device determines the first service by using the degree of overlapping between the at least one ROI and each type of to-be-matched region as an input of the prediction model.

In another possible implementation, the ROI includes one or more of a first ROI, a second ROI, a third ROI, and a fourth ROI. The first ROI is a region including a pressing position of the first operation. The second ROI is a central region of the first interface. The third ROI is an entire region of the first interface. The fourth ROI is a region that accounts for a preset proportion of the first interface.

In another possible implementation, the region including the pressing position is a rectangular region.

In another possible implementation, the type and the location information of each to-be-matched region on the first interface are specifically determined by a server based on the content of the first interface by using a neural network algorithm or an image content detection algorithm.

In another possible implementation, the type of the to-be-matched region includes one or more of the following types: a text region, an image region, or a QR code region.

In another possible implementation, that the degree of overlapping between the at least one ROI and each type of to-be-matched region is determined based on the at least one ROI and a type and location information of each to-be-matched region on the first interface includes: determining a first intersection over union IoU of each to-be-matched region and the at least one ROI based on the location information of each to-be-matched region; and merging first IoUs of to-be-matched regions of a same type and the at least one ROI based on the type of each to-be-matched region, to obtain the degree of overlapping between the at least one ROI and each type of to-be-matched region.

In another possible implementation, the determining a first intersection over union IoU of each to-be-matched region and the at least one ROI based on the location information of each to-be-matched region includes: determining a second IoU of each to-be-matched region and the at least one ROI based on the location information of each to-be-matched region; determining a distance between a center point of each to-be-matched region and a center point of the at least one ROI based on the location information of each to-be-matched region; normalizing the distance between the center point of each to-be-matched region and the center point of the at least one ROI, and obtaining an attenuation coefficient of each to-be-matched region based on a normalized distance; and for each to-be-matched region, performing attenuation processing on a second IoU of the to-be-matched region and the at least one ROI by using an attenuation coefficient of the to-be-matched region, to obtain the first IoU of each to-be-matched region and the at least one ROI.

In another possible implementation, the electronic device receives an operation of choosing, by the user, to use the first service. The electronic device uses the first service and the degree of overlapping between the at least one ROI and each type of to-be-matched region as a first training sample, and updates the prediction model by using the first training sample, so that the prediction model has a function of determining the first service based on the degree of overlapping between the at least one ROI and each type of to-be-matched region.

In another possible implementation, the electronic device receives an operation of choosing, by the user, to use a second service. The second service is the optical character recognition service, the visual shopping service, the text translation service, or the QR code recognition service, and the second service is different from the first service. The electronic device uses the second service and the degree of overlapping between the at least one ROI and each type of to-be-matched region as a second training sample, and updates the prediction model by using the second training sample, so that the prediction model has a function of determining the second service based on the degree of overlapping between the at least one ROI and each type of to-be-matched region.

In another possible implementation, the second interface further includes an identifier of the second service. That the electronic device receives an operation of choosing, by the user, to use a second service is specifically: receiving an operation performed by the user on the identifier of the second service.

According to a fourth aspect of this application, a layout analysis system is provided. The layout analysis system may include an electronic device and a server, and is configured to perform the layout analysis method according to any one of the first aspect or the possible implementations of the first aspect.

According to a fifth aspect of this application, a chip system is provided. The chip system is applied to the electronic device according to any one of the third aspect and the possible implementations of the third aspect. The chip system includes one or more interface circuits and one or more processors. The interface circuit and the processor are interconnected through a line. The processor receives computer instructions from a memory of the electronic device through the interface circuit and executes the computer instructions.

According to a sixth aspect of this application, a computer-readable storage medium is provided, configured to store the computer instructions run by the electronic device according to any one of the third aspect and the possible implementations of the third aspect.

According to a seventh aspect of this application, a computer program product is provided, including the computer instructions run by the electronic device according to any one of the third aspect and the possible implementations of the third aspect.

It may be understood that for beneficial effects that can be achieved by the electronic device according to the second aspect and any possible design manner of the second aspect, the electronic device according to the third aspect and any possible design manner of the third aspect, the layout analysis system according to the fourth aspect, the chip system according to the fifth aspect, the computer-readable storage medium according to the sixth aspect, and the computer program product according to the seventh aspect, refer to beneficial effects in the first aspect and any possible design manner of the first aspect. Details are not described herein again.

DETAILED DESCRIPTION OF ILLUSTRATIVE EMBODIMENTS

Figure 1:
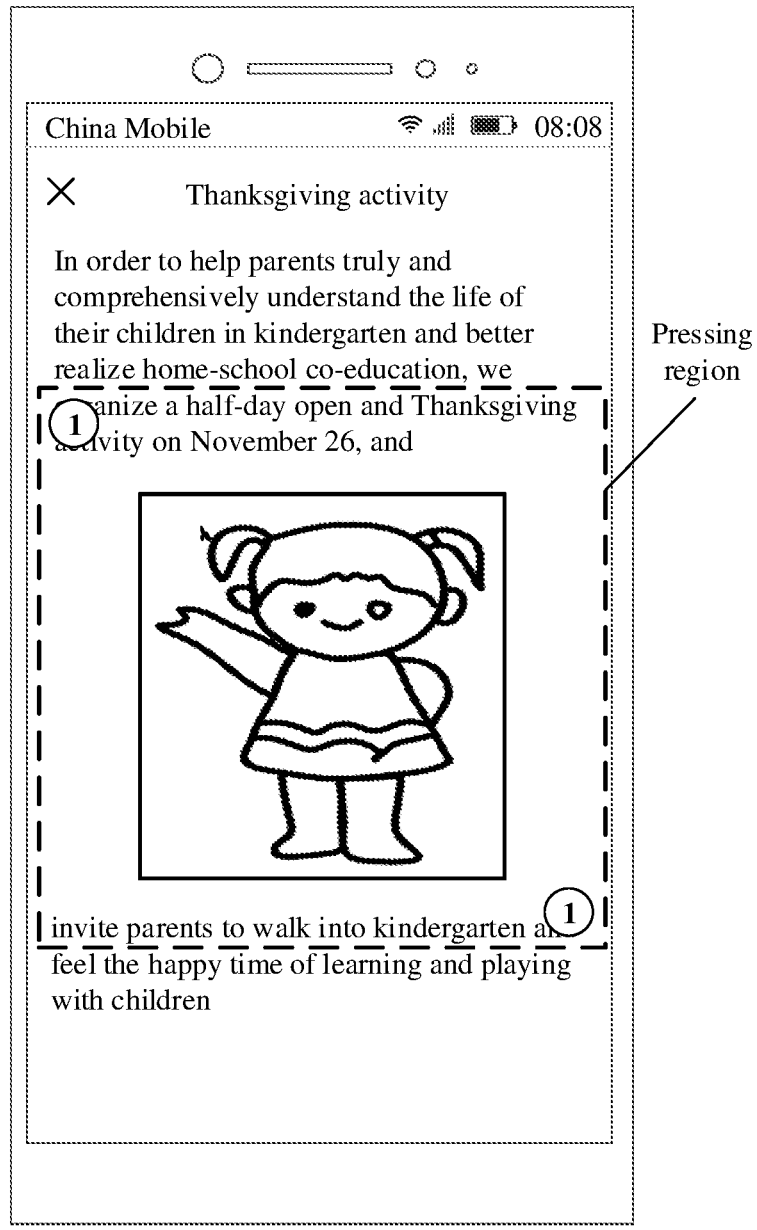
FIG. 1 is a schematic diagram of an example of a layout analysis interface according to an embodiment of this application.

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more.

An embodiment of this application provides a layout analysis method. The method may be used in a process in which an electronic device provides a layout analysis service for a user. Specifically, after a user operation for triggering the electronic device to perform layout analysis is received, as a response to the operation, at least one region of interest (region of interest, ROI) may be obtained, and a type and location information of each region (for example, referred to as each to-be-matched region) on a current display interface are determined based on content of the current display interface on a screen of the electronic device. Then, a degree of overlapping between the at least one ROI and each type of to-be-matched region may be determined based on the obtained at least one ROI and the type and the location information of each to-be-matched region on the current display interface. In this way, by using at least the determined degree of overlapping between the at least one ROI and each type of to-be-matched region, a service such as an optical character recognition service, a visual shopping service, a text translation service, or a QR code recognition service that the user specifically wants to use by triggering the electronic device to perform layout analysis may be determined, and the determined service is run, so that a layout analysis result obtained after the service is run is displayed on the touchscreen of the electronic device. It can be learned that a service that the user wants to use by triggering layout analysis is analyzed and determined based on the at least one ROI and the content of the current display interface on the screen of the electronic device, so that the electronic device can provide the user with a layout analysis result that better meets a user requirement, thereby improving practicability and efficiency of layout analysis of the electronic device.

It should be noted that the layout analysis method provided in this embodiment may be implemented by the electronic device and a server in cooperation, or may be implemented by the electronic device alone.

For example, the electronic device in this embodiment of this application may be a mobile phone, a tablet computer, a desktop computer, a laptop computer, a handheld computer, a notebook computer, an ultra-mobile personal computer (ultra-mobile personal computer, UMPC), a netbook, or a device that supports a layout analysis function, such as a cellular phone, a personal digital assistant (personal digital assistant, PDA), or an augmented reality (augmented reality, AR)/virtual reality (virtual reality, VR) device. A specific form of the electronic device is not specifically limited in this embodiment of this application. The server in this embodiment of this application is a device configured to store data and provide a computing capability. The server may be a single computer device, or may be a large-scale computer cluster. A specific form of the server is not specially limited herein in this embodiment of this application.

The following describes implementations of this embodiment of this application in detail with reference to the accompanying drawings.

Figure 2:
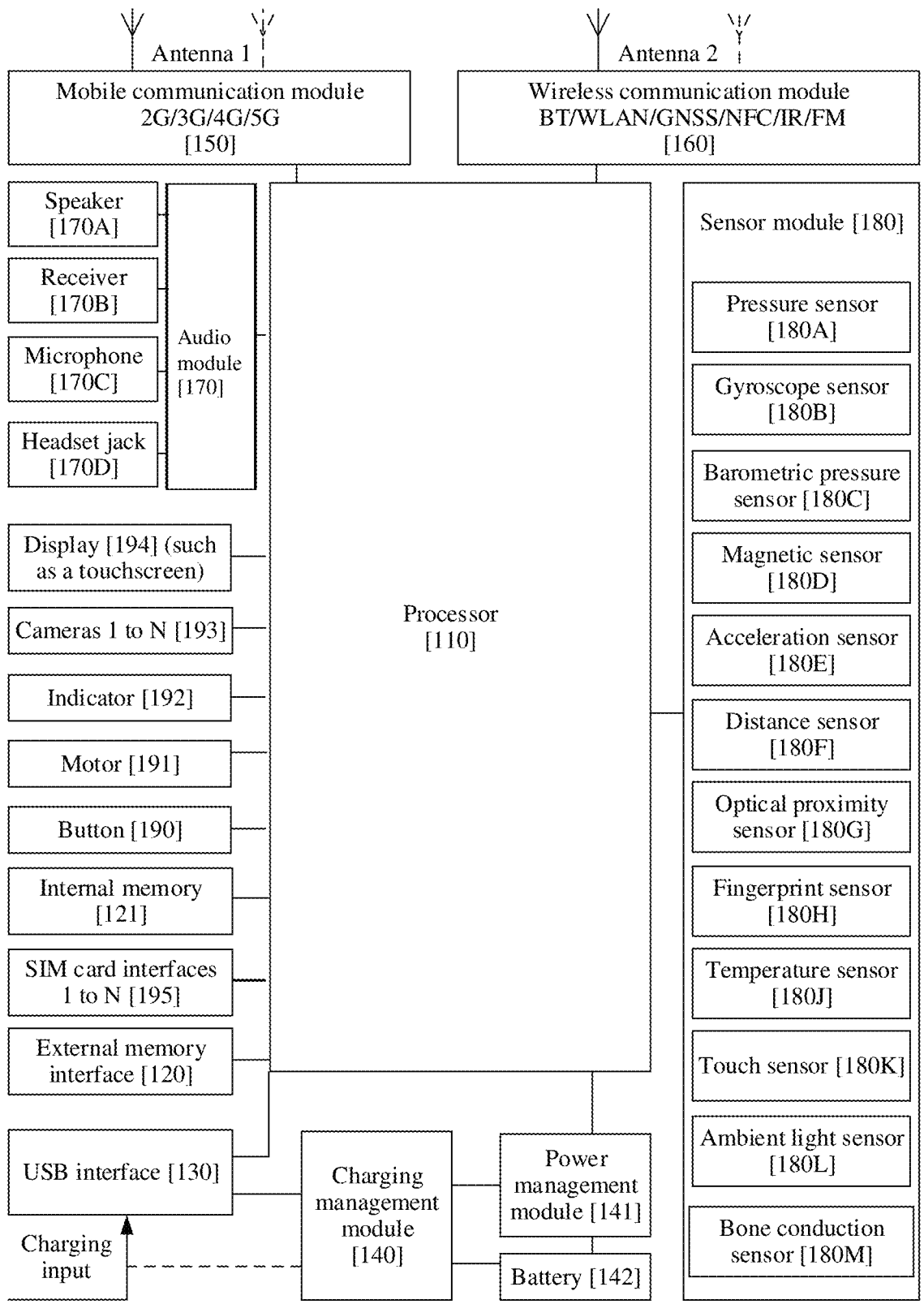
FIG. 2 is a schematic diagram of a hardware structure of an electronic device according to an embodiment of this application.

FIG. 2 is a schematic diagram of a structure of an electronic device according to an embodiment of this application. As shown in FIG. 2, the electronic device may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

The sensor module 180 may include sensors such as a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, and a bone conduction sensor 180M.

It may be understood that the structure shown in this embodiment does not constitute a specific limitation on the electronic device. In some other embodiments, the electronic device may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors. The controller may be a nerve center and a command center of the electronic device. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The processor 110 may interact with another component of the electronic device through the one or more interfaces. It may be understood that an interface connection relationship between the modules shown in FIG. 2 is merely an example for description, and does not constitute a limitation on the structure of the electronic device.

The charging management module 140 is configured to receive a charging input from a charger. The charger may be a wireless charger or a wired charger. The power management module 141 is configured to connect the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like.

A wireless communication function of the electronic device may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna of the electronic device may be configured to cover one or more communication frequency bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a solution to wireless communication such as 2G/3G/4G/5G applied to the electronic device. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation.

The wireless communication module 160 may provide wireless communication solutions, applied to the electronic device, for example, a wireless local area network (wireless local area network, WLAN) (such as a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology.

The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the electronic device, the antenna 1 and the mobile communication module 150 are coupled, and the antenna 2 and the wireless communication module 160 are coupled, so that the electronic device can communicate with the network and another device by using a wireless communication technology.

The electronic device implements a display function by using the GPU, the display 194, the application processor, and the like. The GPU is a microprocessor for image processing, and is connected to the display 194 and the application processor. The GPU is configured to perform mathematical and geometric calculation, and render an image. The processor 110 may include one or more GPUs, which execute program instructions to generate or change display information. The display 194 is configured to display an image, a video, and the like. The display 194 includes a display panel. The electronic device may implement an image shooting function by using the ISP, the camera 193, the video codec, the GPU, the display 194, the application processor, and the like. The ISP is configured to process data fed back by the camera 193. The camera 193 is configured to capture a static image or a video. In some embodiments, the electronic device may include one or N cameras 193, where N is a positive integer greater than 1.

The digital signal processor is configured to process a digital signal, and may process another digital signal in addition to the digital image signal. For example, when the electronic device selects a frequency, the digital signal processor is configured to perform Fourier transform on frequency energy.

The video codec is configured to compress or decompress a digital video. The electronic device may support one or more video codecs. In this way, the electronic device may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information with reference to a structure of a biological neural network, for example, a transfer mode between human brain neurons, and may further continuously perform self-learning. The NPU can implement applications such as intelligent cognition of the electronic device, for example, image recognition, facial recognition, voice recognition, and text understanding.

The external memory interface 120 may be configured to connect to an external storage card, for example, a micro SD card, to extend a storage capability of the electronic device. The external storage card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the electronic device and data processing. The internal memory 121 may include a program storage area and a data storage area.

The program storage area may store an operating system, an application required by at least one function (such as a sound playing function or an image playing function), and the like. The data storage area may store data (such as audio data and a phone book) created when the electronic device is used, and the like. In addition, the internal memory 121 may include a high-speed random access memory, and may further include a nonvolatile memory such as at least one magnetic disk storage device, a flash memory, or a universal flash storage (universal flash storage, UFS).

The electronic device may implement an audio function such as music playing and recording by using the audio module 170, the speaker 170A, the receiver 170B, the microphone 170C, the headset jack 170D, the application processor, and the like. The audio module 170 is configured to convert digital audio information into an analog audio signal for output, and is also configured to convert an analog audio input into a digital audio signal. The headset jack 170D is configured to connect to a wired headset. The button 190 includes a power button, a volume button, and the like. The button 190 may be a mechanical button, or may be a touch button. The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or be separated from the electronic device. The electronic device may support one or N SIM card interfaces, where N is a positive integer greater than 1. The SIM card interface 195 may support a nano-SIM card, a micro-SIM card, a SIM card, and the like. Methods in the following embodiments may be implemented in the electronic device having the foregoing hardware structure.

In the following embodiments, an example in which the electronic device is a mobile phone is used to describe the methods in embodiments of this application.

Embodiment 1

Figure 3:
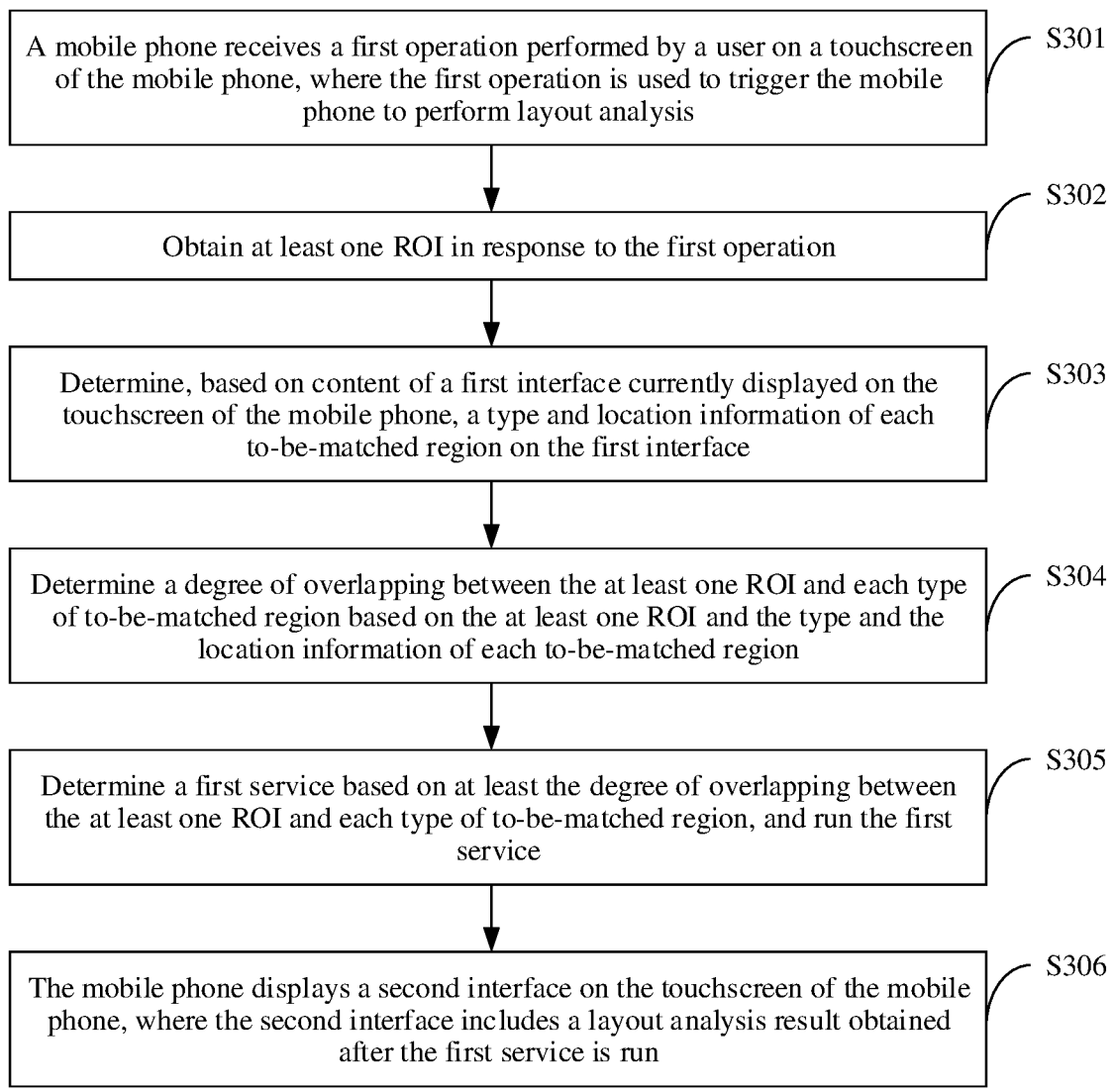
FIG. 3 is a schematic flowchart of a layout analysis method according to an embodiment of this application.

Embodiment 1 of this application provides a layout analysis method. As shown in FIG. 3, the layout analysis method may include steps S301 to S306. The following describes steps S301 to S306 in detail.

S301: A mobile phone receives a first operation performed by a user on a touchscreen of the mobile phone, where the first operation is used to trigger the mobile phone to perform layout analysis.

Layout analysis (which can be understood as interface content analysis, for example, a HiTouch function of a Huawei phone can intelligently provide different services for the user based on different content at a pressing position on the screen) has currently been an important function of the mobile phone. After receiving a user operation that triggers a layout analysis function (for example, the HiTouch function of the Huawei phone), the mobile phone may provide different services for the user based on different content in a region of interest of the user, for example, an optical character recognition service, a visual shopping service, a text translation service, or a QR code recognition service.

In this embodiment, the user operation used to trigger the mobile phone to perform layout analysis may be referred to as a first operation. For example, the first operation may be a pressing operation. In addition, the user may use one, two, or more fingers to perform the first operation. For example, the first operation may be specifically a pressing operation performed by two fingers of the user on the touchscreen of the mobile phone. For ease of description, in this embodiment, the pressing operation performed by two fingers of the user on the touchscreen is referred to as a two-finger pressing operation. In the following embodiments, an example in which the first operation is a two-finger pressing operation is used for description. For example, the layout analysis function is the HiTouch function of Huawei. With reference to FIG. 1, the mobile phone may receive the two-finger pressing operation performed by the user on the touchscreen of the mobile phone. Positions shown by two "①" in FIG. 1 are positions respectively pressed by two fingers of the user on the touchscreen of the mobile phone.

S302: Obtain at least one ROI in response to the first operation.

That the layout analysis function is the HiTouch function of Huawei is still used as an example. According to statistics, when triggering the HiTouch function of the mobile phone, different users have different pressing habits when performing the first operation, for example, performing the two-finger pressing operation. For example, in this embodiment, users with different pressing habits are classified into three types: a first type of user, a second type of user, and a third type of user. The following describes the three types of users. For example, a region in which the user wants an electronic device to provide specific content of a layout analysis service is referred to as a region of interest.

Figure 4A:
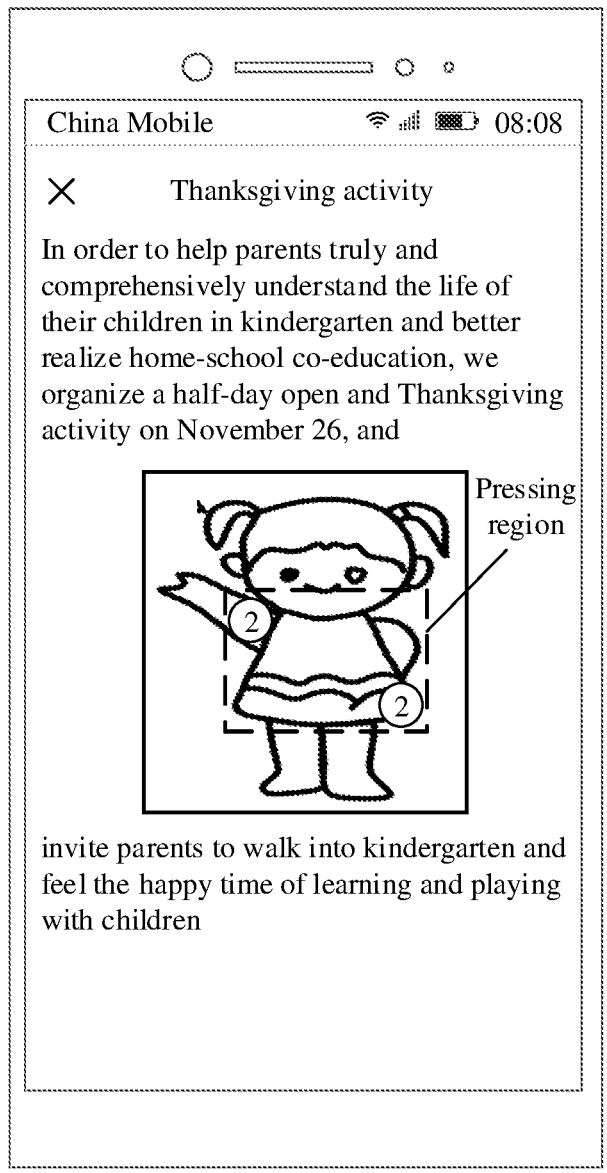
FIG. 4($a$) and FIG. 4($b$) are a schematic diagram of an example of another layout analysis interface according to an embodiment of this application.

The first type of user is a user who has a habit of explicitly performing the two-finger pressing operation on the region of interest on the touchscreen. That is, when the user needs the mobile phone to provide the layout analysis service, the user explicitly performs the two-finger pressing operation on the region of interest. For example, refer to FIG. 1. The region of interest of the user is a region in which a little girl's skirt in FIG. 1 is located. As shown in FIG. 4(a), the user uses two fingers to perform the two-finger pressing operation at a position of the little girl's skirt displayed on the touchscreen of the mobile phone, for example, at positions shown by two "②" in FIG. 4(a). It can be seen that the pressing region, for example, a rectangular region including two pressing positions "②", is clearly targeted at the region in which the little girl's skirt is located.

The second type of user is a user who has a habit of selecting the region of interest by performing the two-finger pressing operation on the touchscreen. That is, when the user needs the mobile phone to provide the layout analysis service, the user does not explicitly perform the two-finger pressing operation on the region of interest, but selects the region of interest by performing the two-finger pressing operation. For example, refer to FIG. 1. The region of interest of the user is still the region in which the little girl's skirt in FIG. 1 is located. As shown in FIG. 1, the user uses two fingers to perform the two-finger pressing operation at a position including the little girl's skirt on the touchscreen of the mobile phone, for example, at positions shown by two "①" in FIG. 1. It can be seen that the pressing region, for example, a rectangular region including two pressing positions "①", is not clearly targeted at the region in which the little girl's skirt is located, but includes the region in which the little girl's skirt is located.

Figure 4B:
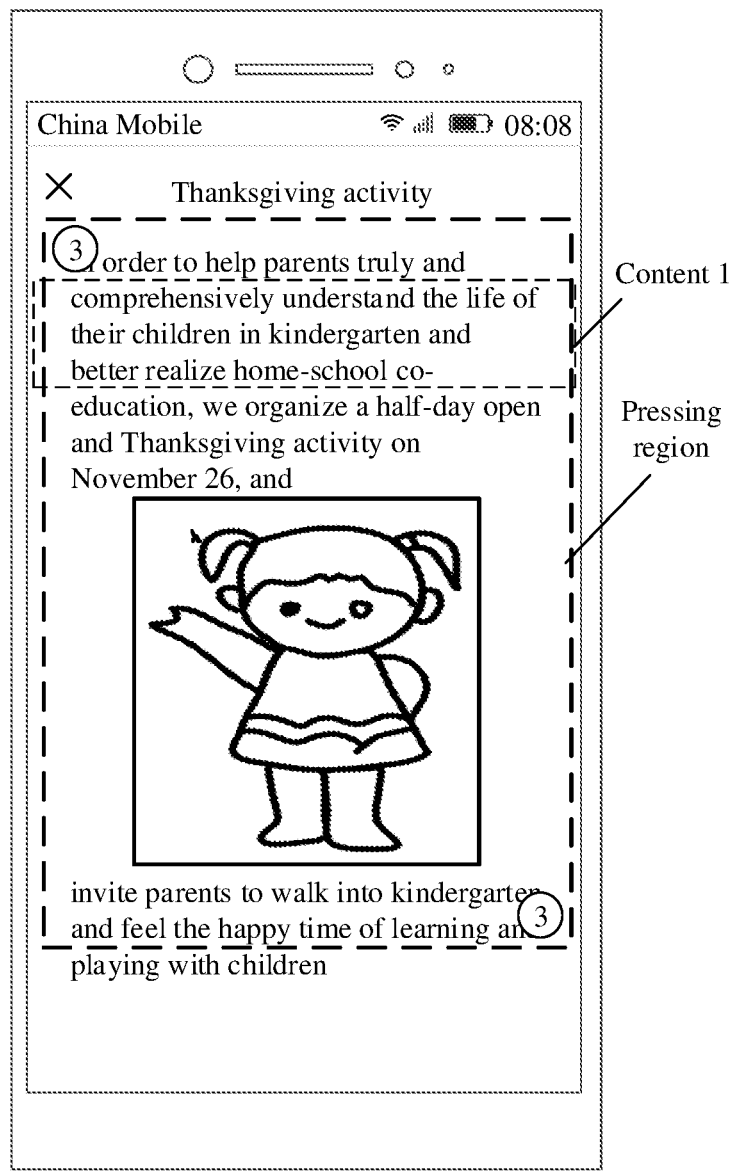
Figure 5A:
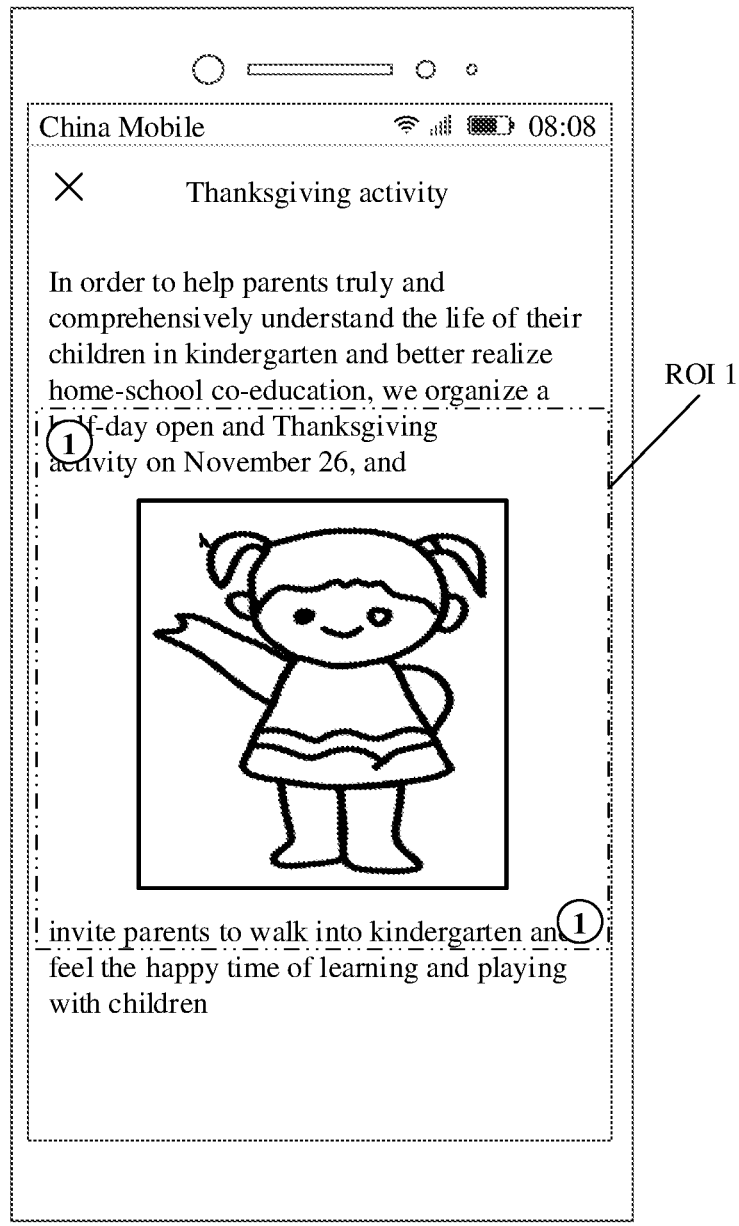
FIG. 5($a$) to FIG. 5($d$) are a schematic diagram of an example of a region of interest of a user according to an embodiment of this application.
Figure 5B:
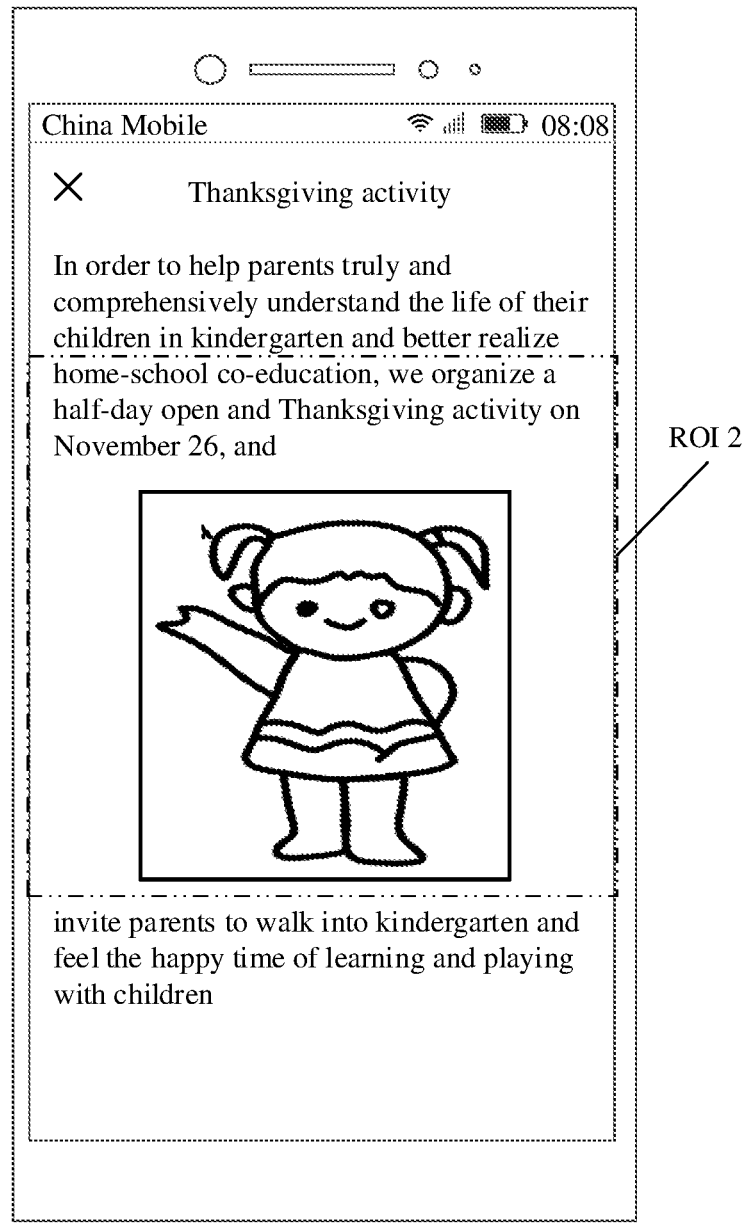
Figure 5C:
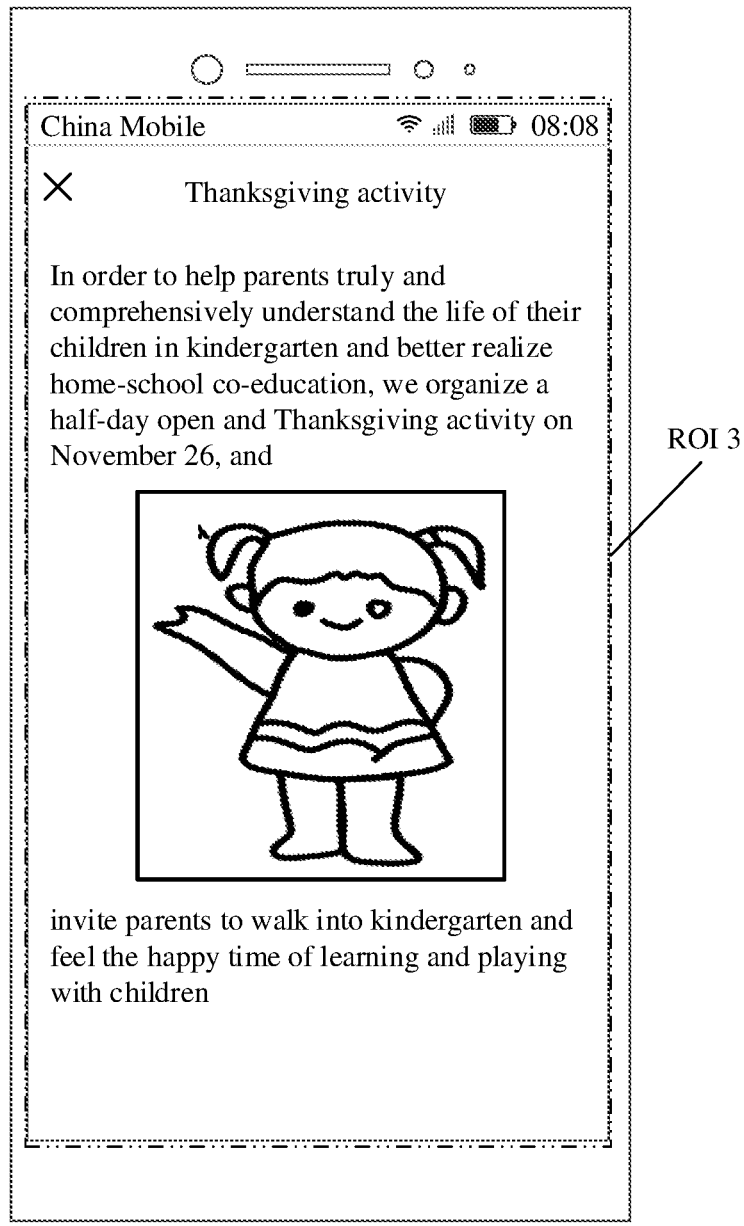
Figure 5D:
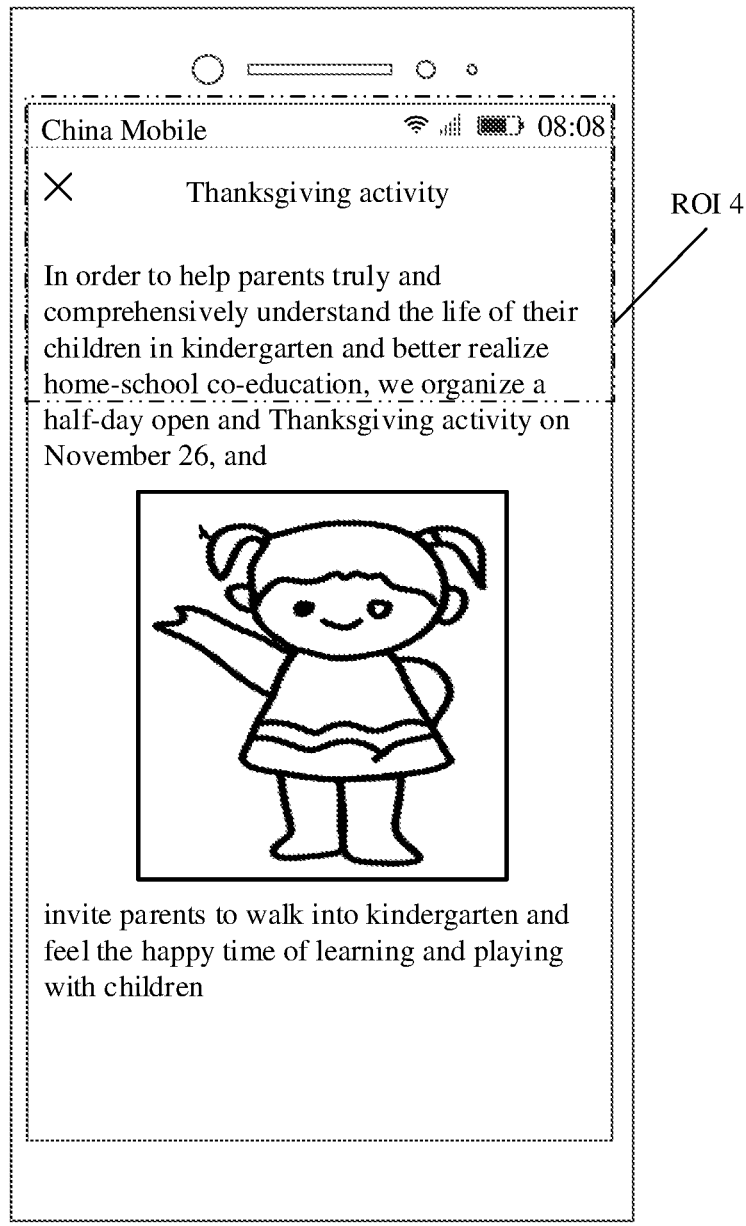

The third type of user is a user who performs the two-finger pressing operation at a relatively fixed position regardless of which region displayed on the touchscreen the user is interested in. That is, when the user needs the mobile phone to provide the layout analysis service, a position at which the user performs the two-finger pressing operation is relatively fixed wherever the region of interest is located on the touchscreen. For example, refer to FIG. 1. The region of interest of the user is still the region in which the little girl's skirt in FIG. 1 is located. As shown in FIG. 4(b), the user uses two fingers to perform the two-finger pressing operation at positions shown by two "③" in FIG. 4(b) on the touchscreen of the mobile phone. In addition, when the region of interest of the user is another region of the touchscreen, for example, a region of content 1 shown in FIG. 4(b), a position at which the user performs the two-finger pressing operation is still the positions shown by two "③" in FIG. 4(b).

It may be understood that, for layout analysis, a specific analysis object should be content in an actual region of interest of the user. For the first type of user and the second type of user, because the two-finger pressing operation is performed on the region of interest, the actual region of interest of the user may be determined based on the pressing positions of the received two-finger pressing operation, so as to perform layout analysis. For example, a region (for example, a rectangular region) including the pressing positions of the received two-finger pressing operation is used as the region of interest (ROI) of the user. For the third type of user, the position at which the user performs the two-finger pressing operation is relatively fixed wherever the region of interest is located on the touchscreen. That is, the user does not perform the two-finger pressing operation on the region of interest. Therefore, the pressing positions of the received two-finger pressing operation cannot reflect the actual region of interest of the user. In some embodiments, a preset region may be used as an ROI of the user. For example, one or more of a central region, an entire region, or a region that accounts for a preset proportion of an interface currently displayed on the touchscreen of the mobile phone may be used as the ROI of the user.

In this embodiment, with reference to FIG. 1, an example in which pressing positions of the first operation, for example, the two-finger pressing operation, received by the mobile phone are at the pressing positions shown by two "①" in FIG. 1 is used. After receiving the two-finger pressing operation, the mobile phone cannot learn of a pressing habit of the user who inputs the operation. Therefore, after receiving the operation, the mobile phone may obtain one or more of the following ROIs: a first ROI, a second ROI, a third ROI, and a fourth ROI.

The first ROI may be a region including the pressing positions of the received two-finger pressing operation. For example, the first ROI may be specifically a rectangular region including the pressing positions of the received two-finger pressing operation. For example, refer to FIG. 1. As shown in FIG. 5(*a*), the pressing positions of the two-finger pressing operation received by the mobile phone are pressing positions shown by two "①" in FIG. 5(*a*), and the first ROI may be a rectangular region including the two pressing positions "①", for example, an ROI 1 shown in FIG. 5(*a*).

The second ROI may be a central region of the interface (for example, referred to as a first interface) currently displayed on the touchscreen of the mobile phone. For example, the central region may be a square region that uses an intersection point of diagonals of the first interface as a center and whose side length is a first value. The first value may be a width of the first interface, or 1/N of a width of the first interface. N is an integer greater than 1, for example, 2, 3, or 4. For example, refer to FIG. 1. The first value is the width of the first interface. As shown in FIG. 5(*b*), the second ROI may be a square region that uses an intersection point of diagonals of the first interface as a center and whose side length is the width of the first interface, for example, an ROI 2 shown in FIG. 5(*b*).

The third ROI may be an entire region of the interface (for example, referred to as the first interface) currently displayed on the touchscreen of the mobile phone. For example, refer to FIG. 1. As shown in FIG. 5(*c*), the third ROI is the entire region of the first interface, for example, an ROI 3 shown in FIG. 5(*c*).

The fourth ROI may be a region that accounts for a preset proportion of the interface (for example, referred to as the first interface) currently displayed on the touchscreen of the mobile phone. The preset proportion may be 1/M. M is an integer greater than 1, for example, 2, 3, or 4. For example, refer to FIG. 1. The preset proportion is ⅓. As shown in FIG. 5(*d*), the fourth ROI may be a region that accounts for ⅓ of the first interface, for example, an ROI 4 shown in FIG. 5(*d*). In FIG. 5(*d*), an example in which the fourth ROI is an upper ⅓ region of the first interface is shown. In some other embodiments, the fourth ROI may be a middle ⅓ region of the first interface, or may be a lower ⅓ region of the first interface. This is not specifically limited in this embodiment.

S303: Determine, based on content of the first interface currently displayed on the touchscreen of the mobile phone, a type and location information of each to-be-matched region on the first interface.

The type of the to-be-matched region includes one or more of the following types: a text region, an image region, or a QR code region.

In this embodiment, region division may be performed on the first interface based on the content of the first interface currently displayed on the touchscreen of the mobile phone, and a region obtained through division may be referred to as a to-be-matched region. For example, after the mobile phone receives the first operation, the mobile phone may perform screenshot processing on the first interface currently displayed on the touchscreen of the mobile phone, to obtain a screenshot of the first interface. Then, image layout analysis may be performed on the screenshot of the first interface. In an example, image layout analysis may be performed on the screenshot of the first interface by using a neural network algorithm or an image content detection algorithm based on pixel distribution, to obtain each to-be-matched region, and determine the type and the location information of each to-be-matched region, to indicate, on the first interface, which part of region is an image region, which part of region is a text region, which part of region is a QR code region, and the like. The location information of the to-be-matched region may be indicated by using locations of a pixel in an upper left corner of the region and a pixel in a lower right corner of the region in the screenshot of the first interface.

Figure 6:
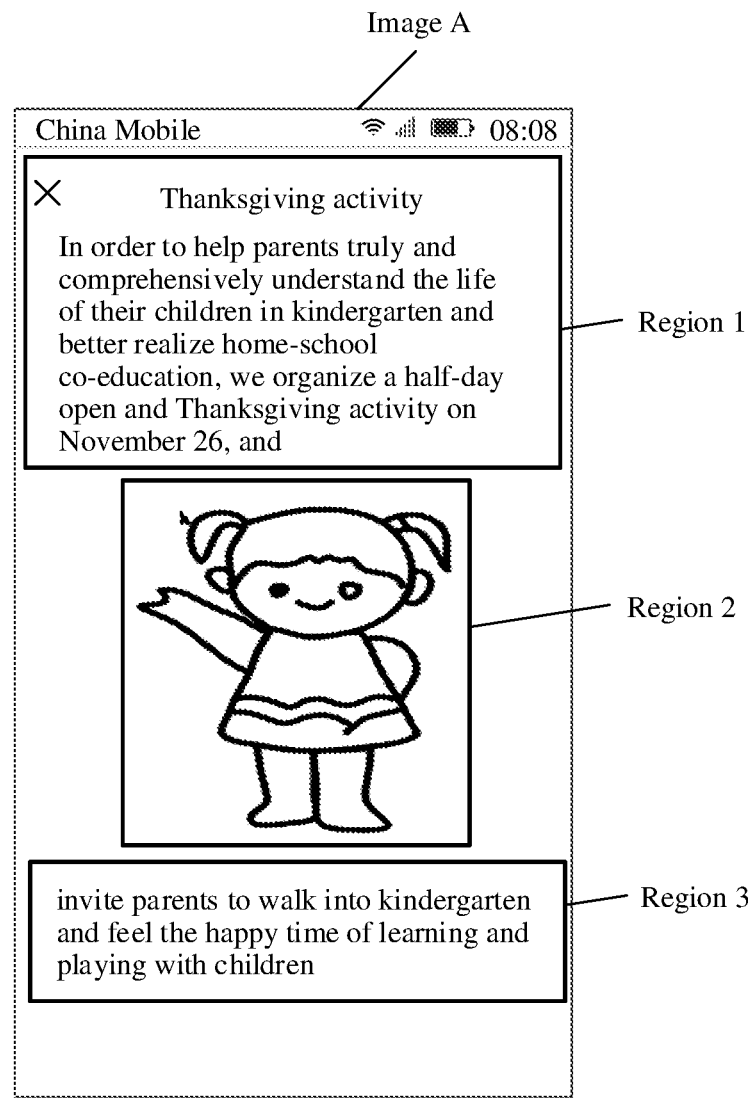
FIG. 6 is a schematic diagram of an example of an image layout analysis result according to an embodiment of this application.

For example, still refer to FIG. 1. After the mobile phone receives the two-finger pressing operation of the user, the mobile phone may obtain a screenshot of the current display interface, that is, the first interface, as shown in FIG. 6, to obtain an image A. Then, image layout analysis may be performed on the image A by using the neural network algorithm or the image content detection algorithm based on pixel distribution. After analysis, it may be obtained that the image A includes three to-be-matched regions: a region 1, a region 2, and a region 3. A type of the region 1 is a text region, and location information is indicated by using locations of a pixel in an upper left corner of the region 1 and a pixel in a lower right corner of the region 1 in the image A. A type of the region 2 is an image region, and location information is indicated by using locations of a pixel in an upper left corner of the region 2 and a pixel in a lower right corner of the region 2 in the image A. A type of the region 3 is a text region, and location information is indicated by using locations of a pixel in an upper left corner of the region 3 and a pixel in a lower right corner of the region 3 in the image A.

S304: Determine a degree of overlapping between the at least one ROI and each type of to-be-matched region based on the at least one ROI and the type and the location information of each to-be-matched region.

After S302 is performed to obtain the at least one ROI and S303 is performed to determine the type and the location information of each to-be-matched region on the first interface, the degree of overlapping between the at least one ROI and each type of to-be-matched region may be determined based on the at least one ROI and the type and the location information of each to-be-matched region. The degree of overlapping may be used to represent a degree of interest of the user in the to-be-matched region. For example, a higher degree of overlapping between the ROI and a type of to-be-matched region indicates that the user is more interested in the type of to-be-matched region.

Figure 7:
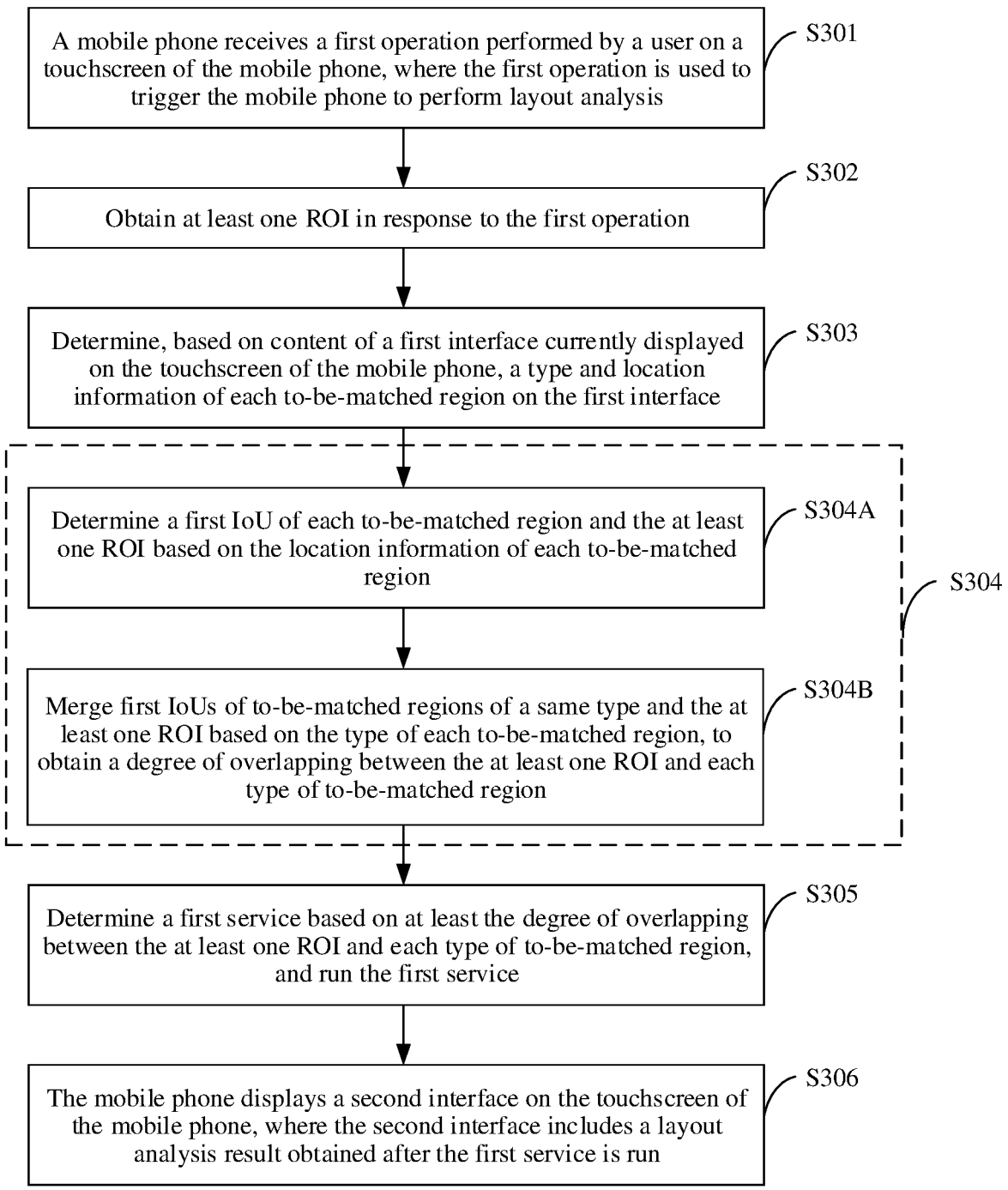
FIG. 7 is a schematic flowchart of another layout analysis method according to an embodiment of this application.

In some embodiments, as shown in FIG. 7, S304 may include the following steps: S304A and S304B.

S304A: Determine a first intersection over union (intersection over union, IoU) of each to-be-matched region and the at least one ROI based on the location information of each to-be-matched region.

Figure 8:
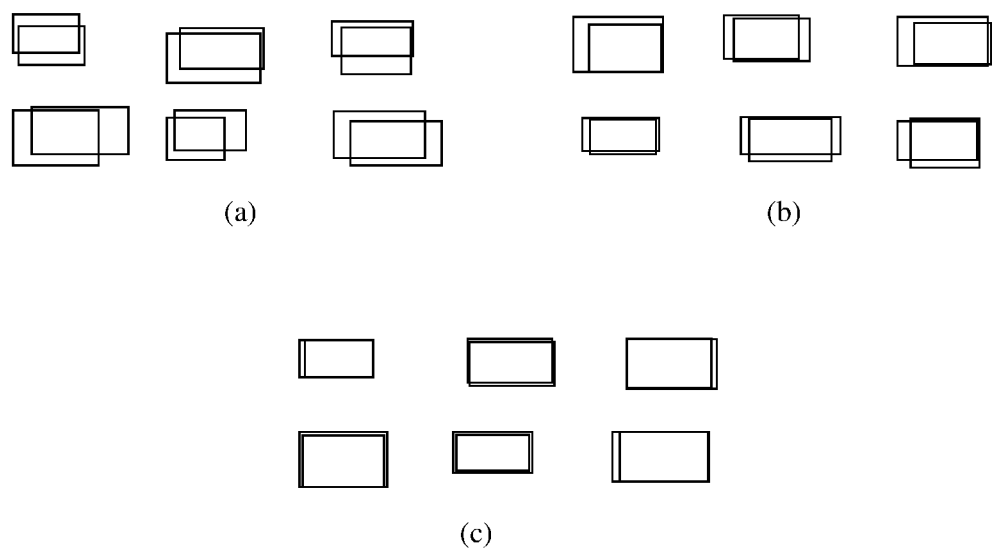
FIG. 8 is a schematic diagram of an example of a region location relationship according to an embodiment of this application.

IoU is an area of an intersection set of two regions, or an area of a union set of two regions. The IoU can be used to measure a degree of overlapping between two regions. A larger IoU indicates a higher degree of overlapping between two regions. For example, as shown in FIG. 8, when a location relationship between two regions is a relationship shown in (a) in FIG. 8, by calculating an area of an intersection set of the two regions or an area of a union set of the two regions, an IoU of the two regions may be determined as IoU=0.5. When a location relationship between two regions is a relationship shown in (b) in FIG. 8, by calculating an area of an intersection set of the two regions or an area of a union set of the two regions, an IoU of the two regions may be determined as IoU=0.7. When a location relationship between two regions is a relationship shown in (c) in FIG. 8, by calculating an area of an intersection set of the two regions or an area of a union set of the two regions, an IoU of the two regions may be determined as IoU=0.9. Refer to FIG. 8. It can be learned that a larger IoU of two regions indicates a higher degree of overlapping between two regions.

In this embodiment, the IoU of each to-be-matched region and the at least one ROI may be determined based on the location information of each to-be-matched region by calculating an area of an intersection set (or an area of a union set) between each to-be-matched region and the at least one ROI. The IoU may be referred to as a second IoU in this embodiment. Which region in the to-be-matched region is the actual region of interest of the user can be preliminarily determined by calculating the IoU (for example, the second IoU) of the to-be-matched region and the ROI.

In some embodiments, the determined second IoU may be used as the first IoU. In some other embodiments, when one ROI covers a plurality of to-be-matched regions, to more accurately determine the actual region of interest of the user, an attenuation coefficient of each to-be-matched region may be determined. Then, for each to-be-matched region, the attenuation coefficient of the to-be-matched region may be used to attenuate the IoU (for example, the second IoU) of the to-be-matched region and the ROI.

For example, a specific processing process of attenuating the second IoU of the to-be-matched region and the ROI may include: determining a distance between a center point of the to-be-matched region and a center point of the ROI based on the location information of the to-be-matched region; and normalizing the distance between the center point of the to-be-matched region and the center point of the ROI, and obtaining an attenuation coefficient of the to-be-matched region based on a normalized distance. An attenuation coefficient of a to-be-matched region whose center point is closer to the center point of the ROI is closer to 1, and an attenuation coefficient of a to-be-matched region whose center point is farther from the center point of the ROI is closer to 0. Then, the attenuation coefficient of the to-be-matched region is used to attenuate the second IoU of the to-be-matched region and the ROI. An IoU obtained after attenuation processing is performed may be used as the first IoU of the to-be-matched region and the ROI.

For example, the attenuation coefficient may be obtained by using the following formula: $y=e^{(-distance/CENTER\_DECAY\_INDEX)}$, where y is an attenuation coefficient, distance is a distance between a center point of a to-be-matched region and a center point of an ROI, CENTER_DECAY_INDEX is the screenshot of the first interface, for example, a diagonal length of the image A, and distance/CENTER_DECAY_INDEX is a distance obtained after the distance between the center point of the to-be-matched region and the center point of the ROI is normalized.

It should be noted that the foregoing is described by using an example in which the attenuation coefficient is determined based on the distance between the center point of the to-be-matched region and the center point of the ROI, and attenuation processing is performed on the IoU of the to-be-matched region and the ROI. In some other embodiments, the attenuation coefficient may be alternatively determined in another manner such as Gaussian blur, to perform attenuation processing on the IoU of the to-be-matched region and the ROI. A manner of determining the attenuation coefficient is not specifically limited herein in this embodiment of this application.

The following describes S304A in detail with reference to a specific example. For example, three ROIs are obtained in S302, and are respectively a first ROI (for example, the ROI 1 shown in FIG. 5(*a*)), a second ROI (for example, the ROI 2 shown in FIG. 5(*b*)), and a third ROI (for example, the ROI 3 shown in FIG. 5(*c*)), and it is determined in S303 that the first interface includes three to-be-matched regions: the region 1, the region 2, and the region 3 shown in FIG. 6. The types of the region 1 and the region 3 are both text regions, and the type of the region 2 is an image region.

Figure 9:
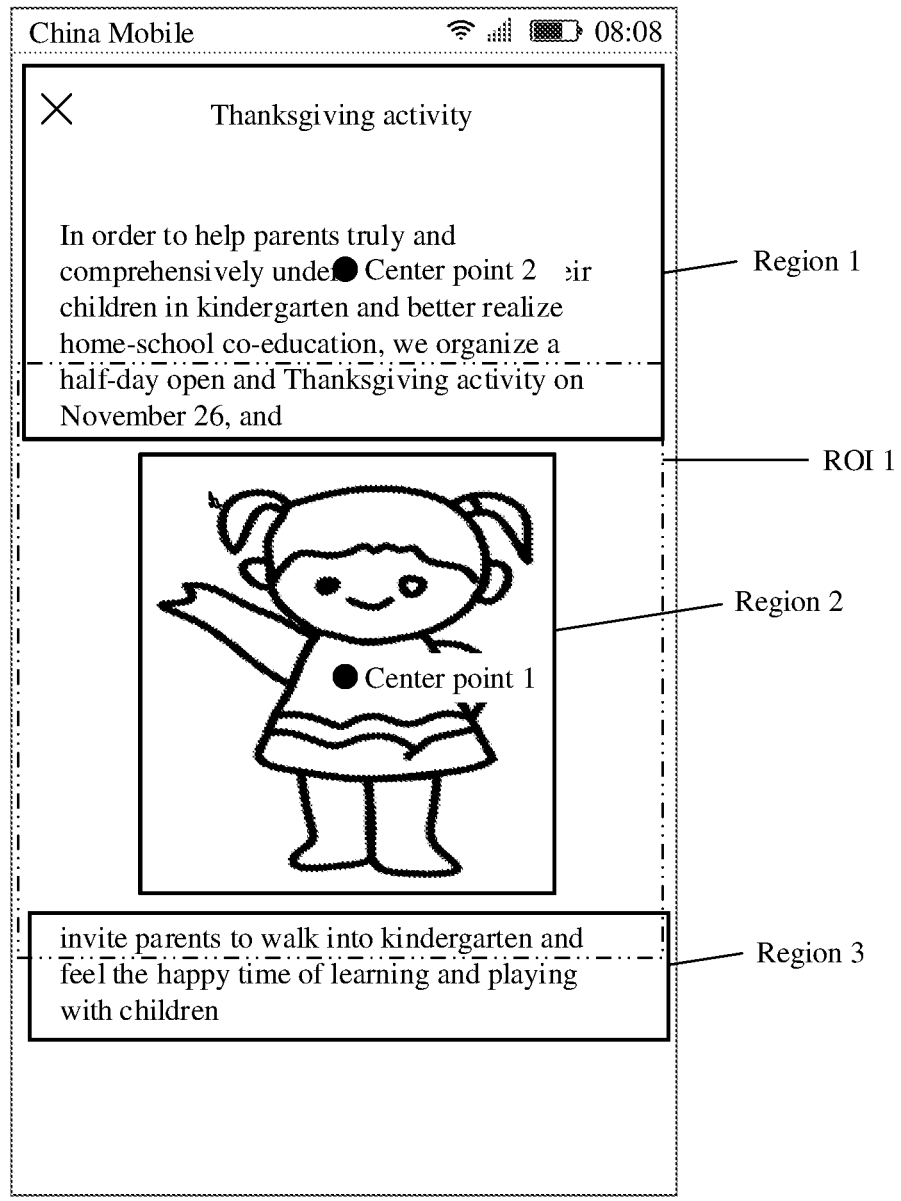
FIG. 9 is a schematic diagram of an example of a location relationship between an ROI and a to-be-matched region according to an embodiment of this application.

With reference to FIG. 5(*a*) to FIG. 5(*d*) and FIG. 6, as shown in FIG. 9, for the ROI 1, an IoU (the IoU is the second IoU) of each of the three to-be-matched regions and the ROI 1 may be determined.

Specifically, an IoU of the region 1 and the ROI 1 is determined based on location information of the region 1 by calculating an area of an intersection set (or an area of a union set) of the region 1 and the ROI 1. For example, IoU_region 1' is used to represent the IoU of the region 1 and the ROI 1, for example, IoU_region 1'=0.3 is calculated. An IoU of the region 2 and the ROI 1 is determined based on location information of the region 2 by calculating an area of an intersection set (or an area of a union set) of the region 2 and the ROI 1. For example, IoU_region 2' is used to represent the IoU of the region 2 and the ROI 1, for example, IoU_region 2'=0.5 is calculated. An IoU of the region 3 and the ROI 1 is determined based on location information of the region 3 by calculating an area of an intersection set (or an area of a union set) of the region 3 and the ROI 1. For example, IoU_region 3' is used to represent the IoU of the region 3 and the ROI 1, for example, IoU_region 3'=0.2 is calculated.

In this embodiment, an IoU of the ROI 1 and the region 1, the region 2, and the region 3 is represented by V1'. In this case, the IoU of the ROI 1 and the three to-be-matched regions is as follows: V1'=<IoU_region 1'=0.3, IoU_region 2'=0.5, and IoU_region 3'=0.2>.

Still refer to FIG. 9. Attenuation processing may be further separately performed on the IoUs. First, an attenuation coefficient of each to-be-matched region may be determined. Specifically, a distance between a center point (for example, a center point 2 shown in FIG. 9) of the region 1 and a center point (for example, a center point 1 shown in FIG. 9) of the ROI 1 is determined based on the location information of the region 1. The distance between the center point 2 and the center point 1 is normalized, and an attenuation coefficient of the region 1 is obtained based on a normalized distance. For example, alpha_region 1 is used to represent the attenuation coefficient of the region 1, for example, alpha_region 1=0.3 is determined. Similarly, attenuation coefficients of the region 2 and the region 3 may be determined. For example, alpha_region 2 is used to represent the attenuation coefficient of the region 2, for example, alpha_region 2=0.9 is determined, and alpha_region 3 is used to represent the attenuation coefficient of the region 3, for example, alpha_region 3=0.2 is determined.

In this embodiment, an attenuation coefficient of the region 1, the region 2, and the region 3 is represented by A1. In this case, the attenuation coefficient of the region 1, the region 2, and the region 3 is as follows: A1=<alpha_region 1=0.3, alpha_region 2=0.9, and alpha_region 3=0.2>.

Then, the attenuation coefficient of each to-be-matched region may be used to attenuate the IoU (that is, the second IoU) of the to-be-matched region and the ROI 1. For example, attenuation processing may be implemented by multiplying an IoU of each region and the ROI 1 by an attenuation coefficient of the region, to obtain an attenuated IoU, that is, obtain the first IoU. For example, if IoU_region 1 is used to represent an attenuated IoU of the region 1 and the ROI 1, IoU_region 1=IoU_region 1'*alpha_region 1=0.3*0.3=0.09. If IoU_region 2 is used to represent an attenuated IoU of the region 2 and the ROI 1, IoU_region 2=IoU_region 2'*alpha_region 2=0.5*0.9=0.45. If IoU_region 3 is used to represent an attenuated IoU of the region 3 and the ROI 1, IoU_region 3=IoU_region 3'*alpha_region 3=0.2*0.2=0.04.

In this embodiment, an attenuated IoU of the ROI 1 and the region 1, the region 2, and the region 3 is represented by V1. In this case, the attenuated IoU of the ROI 1 and the three to-be-matched regions is as follows: V1=<IoU_region 1=0.09, IoU_region 2=0.45, and IoU_region 3=0.04>.

It can be learned that the IoU of the ROI 1 and the region 1, the region 2, and the region 3 may be obtained by performing the foregoing operations, and is used to represent a degree of overlapping between the ROI 1 and each to-be-matched region in the region 1, the region 2, and the region 3.

Similarly, after the foregoing operations are separately performed for the ROI 2 and the ROI 3, an IoU of the ROI 2 and the region 1, the region 2, and the region 3 may also be obtained, to represent a degree of overlapping between the ROI 2 and each to-be-matched region in the region 1, the region 2, and the region 3, and an IoU of the ROI 3 and the region 1, the region 2, and the region 3 is obtained, to represent a degree of overlapping between the ROI 3 and each to-be-matched region in the region 1, the region 2, and the region 3. For example, V2 is used to represent the IoU of the ROI 2 and the region 1, the region 2, and the region 3, and V3 is used to represent the IoU of the ROI 3 and the region 1, the region 2, and the region 3.

S304B: Merge first IoUs of to-be-matched regions of a same type and the at least one ROI based on the type of each to-be-matched region, to obtain the degree of overlapping between the at least one ROI and each type of to-be-matched region.

In this embodiment, considering that when the user performs the first operation, for example, the two-finger pressing operation, two pressing positions of the two-finger pressing operation may be located in two regions, as shown in FIG. 4(b), the two pressing positions (positions of "③" shown in FIG. 4(b)) of the two-finger pressing operation are respectively located in two text regions, after S304A is performed to obtain the first IoU of each to-be-matched region and the ROI, first IoUs of to-be-matched regions of a same type and the ROI may be merged, to obtain the degree of overlapping between the ROI and each type of to-be-matched region.

For example, with reference to the example in S304A, the types of the region 1 and the region 3 are both text regions, and the type of the region 2 is an image region. The attenuated IoU of the ROI 1 and the region 1, the region 2, and the region 3 is as follows: V1=<IoU_region 1=0.09, IoU_region 2=0.45, and IoU_region 3=0.04>. In this case, attenuated IoUs of the region 1 and the region 3 of the same type and the ROI 1 may be merged, to obtain a degree of overlapping between the ROI 1 and each type of to-be-matched region. If S1 is used to represent the degree of overlapping between the ROI 1 and each type of to-be-matched region, S1=<text=0.13, image=0.45>.

Similarly, for the ROI 2, attenuated IoUs of to-be-matched regions of a same type and the ROI 2 may be merged according to V2, to obtain a degree of overlapping between the ROI 2 and each type of to-be-matched region. For example, S2 is used to represent the degree of overlapping between the ROI 2 and each type of to-be-matched region. For the ROI 3, attenuated IoUs of to-be-matched regions of a same type and the ROI 3 may be merged according to V3, to obtain a degree of overlapping between the ROI 3 and each type of to-be-matched region. For example, S3 is used to represent the degree of overlapping between the ROI 3 and each type of to-be-matched region.

It should be noted that in this embodiment of this application, S302 to S304 may be all implemented by the mobile phone, or may be all implemented by the server, or may be partially implemented by the mobile phone and partially implemented by the server. For example, an example in which S302 to S304 are partially implemented by the mobile phone and partially implemented by the server is used. In an example, S302 and S304 may be implemented by the mobile phone, and S303 may be implemented by the server. Before the server performs S303, the mobile phone may take a screenshot of the first interface currently displayed on the touchscreen of the mobile phone and send the screenshot to the server, to serve as a basis for the server to perform S303. In addition, the type and the location information that are of each to-be-matched region on the first interface and that are obtained by the server by performing S303 need to be sent to the mobile phone, to serve as a basis for the mobile phone to perform S304.

S305: Determine a first service based on at least the degree of overlapping between the at least one ROI and each type of to-be-matched region, and run the first service.

The first service is an optical character recognition service, a visual shopping service, a text translation service, or a QR code recognition service.

As described in the foregoing embodiment, a higher degree of overlapping between the ROI and a type of to-be-matched region indicates that the user is more interested in the type of to-be-matched region. Therefore, the degree of overlapping between the at least one ROI and each type of to-be-matched region obtained in S304 may be used as a basis for determining a service to be provided for the user.

S305 may be implemented by the mobile phone or the server. For example, the mobile phone implements S305. In this embodiment, the mobile phone may store a prediction model, and the prediction model has a function of determining, based on a degree of overlapping between regions, a service that needs to be run. After obtaining the degree of overlapping between the at least one ROI and each type of to-be-matched region in S304, the mobile phone may use the obtained degree of overlapping between the at least one ROI and each type of to-be-matched region as an input of the prediction model, to determine the service that needs to be run, that is, determine the first service.

In an example, the prediction model may be obtained through training by using a training sample generated based on service logic, and stored in the mobile phone before the mobile phone is delivered from a factory. In some embodiments, the prediction model may be a logistic regression (logistic regression) model, a linear regression (Linear Regression) model, or the like.

The service logic may be specifically as follows: After the user inputs the two-finger pressing operation, if main content displayed in the pressing region is a text, the optical character recognition service is provided; if main content displayed in the pressing region is an image, the visual shopping service is provided; and if main content displayed in the pressing region is a QR code, the QR code recognition service is provided.

A training process of the prediction model may be as follows: First, the first operation may be performed by default. For example, all users performing the two-finger pressing operation are the first type of user or the second type of user described in S302, and an X-Y key-value pair that meets the first type of user and/or the second type of user is constructed. The X-Y key-value pair may be referred to as a training sample. X represents the degree of overlapping between the at least one ROI and each type of to-be-matched region obtained after the first type of user or the second type of user inputs the two-finger pressing operation, and may be used as an input of the model. Y represents a service provided after the first type of user or the second type of user inputs the two-finger pressing operation, and may be used as an output of the model. In addition, the X-Y key-value pair conforms to the service logic. Then, model training may be performed by using the constructed X-Y key-value pair, to obtain the prediction model, so that the prediction model has a function of determining, based on a degree of overlapping between regions, a service that needs to be run. Before the mobile phone is delivered from a factory, the obtained prediction model may be stored in the mobile phone. In this way, with reference to the foregoing examples in S301 to S304, when the mobile phone receives operations performed by the user at the pressing positions shown by two "①" in FIG. 1, after processing in S302 to S304, based on the prediction model stored in the mobile phone, the mobile phone may input the obtained S1, S2, and S3 into the prediction model. An output result of the prediction model is a determined service that needs to be run, that is, the first service. Because the training sample for constructing the prediction model conforms to the service logic, the first service determined in this embodiment is the visual shopping service.

The mobile phone may further run the first service. In this embodiment, content analyzed when the first service is run may be content corresponding to the first service in a region including the pressing positions in the received first operation, for example, the two-finger pressing operation, or may be content corresponding to the first service on the first interface. For example, the first service is the optical character recognition service, and content corresponding to the first service is a text. The first service is the visual shopping service, and content corresponding to the first service is an image. The first service is the text translation service, and content corresponding to the first service is a text. The first service is the QR code recognition service, and content corresponding to the first service is a QR code. For example, with reference to FIG. 1 and the foregoing example, the mobile phone runs the visual shopping service, and content analyzed when the visual shopping service is run is an image in the rectangular region including the pressing positions shown by two "①" in FIG. 1.

S306: The mobile phone displays a second interface on the touchscreen of the mobile phone, where the second interface includes a layout analysis result obtained after the first service is run.

Figure 10:
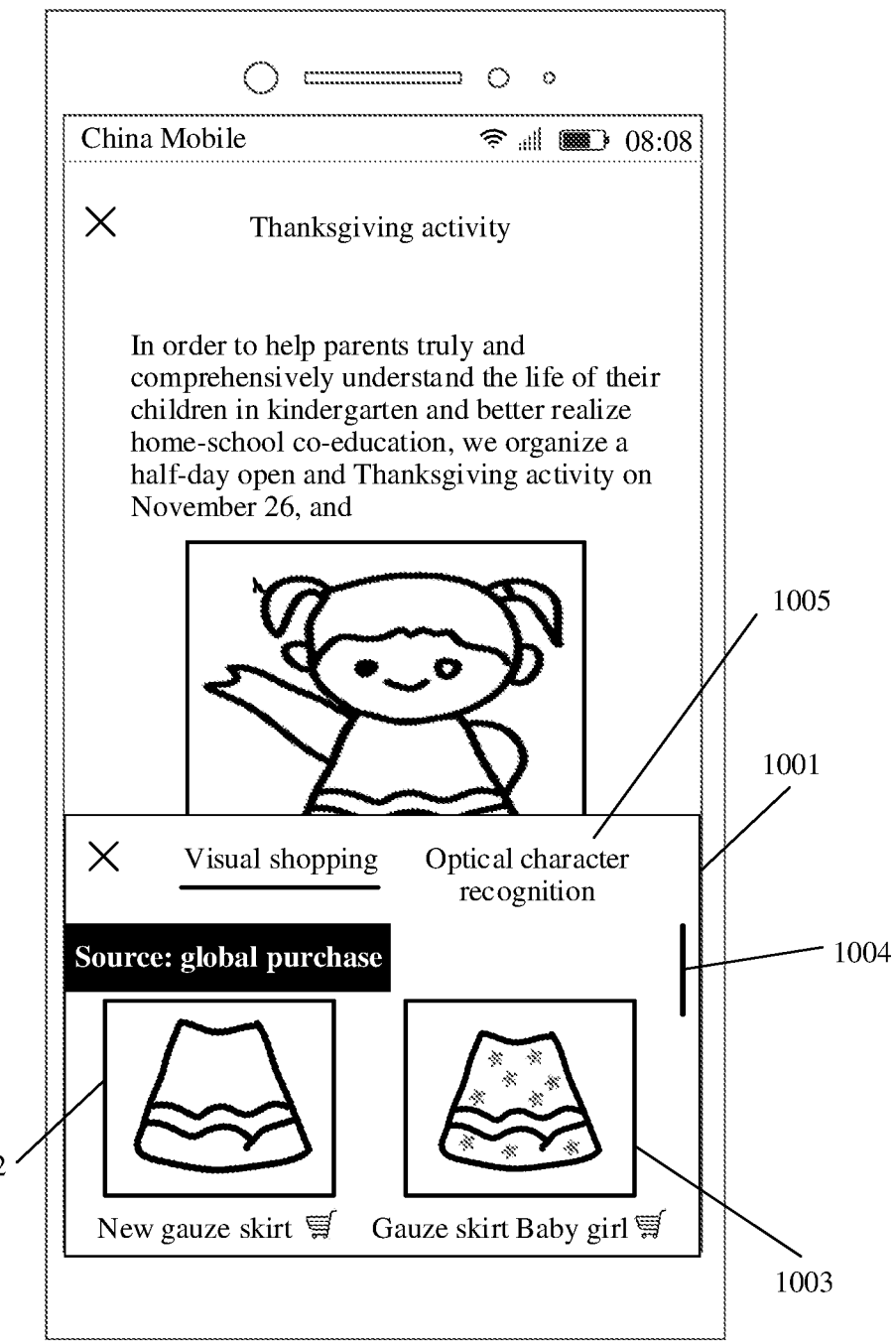
FIG. 10 is a schematic diagram of an example of still another layout analysis interface according to an embodiment of this application.

After determining and running the first service in S305, the mobile phone may display, on the touchscreen of the mobile phone, the second interface including the layout analysis result obtained after the first service is run. For example, with reference to the example in S305, as shown in FIG. 10, the mobile phone displays a second interface 1001. The second interface 1001 includes a layout analysis result obtained after the visual shopping service is run. As shown in FIG. 1, by analyzing the image in the rectangular region (for example, the pressing region shown in FIG. 1) including the pressing positions shown by two "①" in FIG. 1, the displayed layout analysis result includes a shopping link of a commodity 1002 and a shopping link of a commodity 1003 that are similar to the little girl's skirt in the pressing region. Further, when a large quantity of layout analysis results are obtained by performing layout analysis, and cannot be completely displayed on the second interface 1001, the second interface 1001 may further include a seekbar 1004. After receiving an operation performed by the user on the seekbar 104, the mobile phone may display another layout analysis result on the second interface 1001.

In this embodiment of this application, further, in a process in which different users use the layout analysis function of the mobile phone, usage habits may be different. Therefore, the mobile phone may further collect a usage habit of the user. For example, the collected usage habit of the user is referred to as a historical operation record. The mobile phone may determine, based on the historical operation record and the stored prediction model, a layout analysis service that needs to be provided for the user after a user operation for triggering layout analysis is received. In this way, the provided layout analysis service can adapt to a usage habit of a current user. For example, for the foregoing prediction model stored before the mobile phone is delivered from a factory, the mobile phone may update the stored prediction model based on the historical operation record.

Specifically, in an example, after S306, the mobile phone may receive a user operation of choosing, by the user, to use a service (for example, the first service or another service different from the first service). After receiving the user operation, the mobile phone may use, as a training sample, the degree of overlapping between the at least one ROI and each type of to-be-matched region that is obtained in S304 and the service selected by the user, to update the prediction model stored in the mobile phone, so that the updated prediction model can better adapt to the usage habit of the current user.

For example, with reference to examples in FIGS. 10 and S306, after the mobile phone displays the second interface 1001, the user may select the recommended first service. The mobile phone may receive an operation of choosing, by the user, to use the first service (that is, the visual shopping service). The operation that is received by the mobile phone and that is of selecting the visual shopping service by the user may be an operation, for example, a tap operation, on the shopping link of the commodity 1002 or the shopping link of the commodity 1003 on the second interface 1001. The operation that is received by the mobile phone and that is of selecting the visual shopping service by the user may also be an operation on the seekbar 1004 on the second interface 1001. Then, the mobile phone may use the degree of overlapping between the at least one ROI and each type of to-be-matched region obtained in S304 and the visual shopping service as a first training sample (for example, may be referred to as a positive sample); and update, by using the first training sample, the prediction model stored in the mobile phone, so that the updated prediction model has a function of determining the visual shopping service based on the degree of overlapping between the at least one ROI and each type of to-be-matched region obtained in S304. For example, a gradient descent algorithm may be used to iterate the prediction model.

For another example, with reference to examples in FIGS. 10 and S306, after the mobile phone displays the second interface 1001, the user may not select the recommended first service, but select another service, for example, a second service. The mobile phone may receive an operation of choosing, by the user, to use the second service. For example, the second service is the optical character recognition service. As shown in FIG. 10, the second interface 1001 may further include an identifier 1005 of the optical character recognition service. The operation that is received by the mobile phone and that is of selecting the optical character recognition service by the user may be an operation, for example, a tap operation, on the identifier 1005 of the optical character recognition service on the second interface 1001. Then, the mobile phone may use the degree of overlapping between the at least one ROI and each type of to-be-matched region obtained in S304 and the optical character recognition service as a second training sample; and update, by using the second training sample, the prediction model stored in the mobile phone, so that the updated prediction model has a function of determining the optical character recognition service based on the degree of overlapping between the at least one ROI and each type of to-be-matched region obtained in S304. Certainly, if the user does not select the recommended first service or another service, the current record may be discarded, that is, the prediction model is not updated. In this way, after the user uses the prediction model for a period of time, after the prediction model is updated for a plurality of times, the updated prediction model is constructed into a model that meets the usage habit of the current user and that has a stable distribution feature, to achieve an effect of adapting to the usage habit of the current user.

S305 and S306 are described by using an example in which after the first service is determined, the first service is directly run, and a layout analysis result after the first service is run is displayed. In some other embodiments, after the first service is determined, the first service may not be run temporarily, but an interface is displayed. The interface may include a layout analysis service that can be provided, for example, include the first service and the second service, and an identifier of the first service is displayed before the identifier of the second service on the interface, or the identifier of the first service is highlighted, to prompt the user that the first service is recommended. Then, after the user selects the first service, the first service may be run, and the layout analysis result obtained after the first service is run is displayed. For example, the first service is the visual shopping service, and the optical character recognition service and the text translation service can be further provided. After determining that the service that needs to be provided for the user is the visual shopping service, the mobile phone may display a menu. The menu includes an identifier of the visual shopping service, an identifier of the optical character recognition service, and an identifier of the text translation service. In addition, in the menu, the identifier of the visual shopping service is arranged before the identifier of the optical character recognition service and the identifier of the text translation service, or in the menu, the identifier of the visual shopping service is highlighted, and the identifier of the optical character recognition service and the identifier of the text translation service are not highlighted. This may prompt the user that the visual shopping service is preferentially recommended. After the user selects the visual shopping service, the visual shopping service is run, and a layout analysis result obtained after the visual shopping service is run is displayed, as shown in FIG. 10.

In this embodiment of this application, after a user operation for triggering the electronic device to perform layout analysis is received, at least one ROI is obtained, and a type and location information of each region on a current display interface are determined based on content of the current display interface on a screen of the electronic device. Then, a degree of overlapping between the at least one ROI and each type of region may be determined based on the obtained at least one ROI and the type and the location information of each region on the current display interface. In this way, by using at least the determined degree of overlapping between the at least one ROI and each type of region, a service such as an optical character recognition service, a visual shopping service, a text translation service, or a QR code recognition service that the user specifically wants to use by triggering the electronic device to perform layout analysis may be determined, and the determined service is run, so that a layout analysis result obtained after the service is run is displayed on the touchscreen of the electronic device. According to the method provided in this embodiment, a service that the user wants to use by triggering layout analysis is analyzed and determined based on the at least one ROI and the content of the current display interface on the screen of the electronic device, for example, analysis is performed by using the prediction model, so that the electronic device can provide the user with a layout analysis result that better meets a user requirement, thereby improving practicability and efficiency of layout analysis of the electronic device. Further, in a use process of the user, a usage habit of the user is collected, and the prediction model is updated based on the collected usage habit. In this way, the layout analysis result provided for the user further meets the user requirement.

Embodiment 2

Embodiment 2 of this application provides an electronic device. The electronic device may include a display, a memory, and one or more processors. The display and the memory are coupled to the processor. The display may include a touchscreen. The memory is configured to store computer program code. The computer program code includes computer instructions. When the processor executes the computer instructions, the electronic device may perform the functions or steps performed by the mobile phone in the foregoing method embodiment. Certainly, the electronic device includes but is not limited to the display, the memory, and the one or more processors. For example, for a structure of the electronic device, refer to the structure of the electronic device shown in FIG. 2.

Embodiment 3

Embodiment 3 of this application provides a server. The server may include a memory and one or more processors. The memory is coupled to the processor. The memory is configured to store computer program code. The computer program code includes computer instructions. When the processor executes the computer instructions, the server may perform the functions or steps performed by the server in the foregoing method embodiment. Certainly, the server includes but is not limited to the memory and the one or more processors. For example, the server may further include a communication interface, configured to implement communication with another device such as the foregoing electronic device.

Embodiment 4

Figure 11:
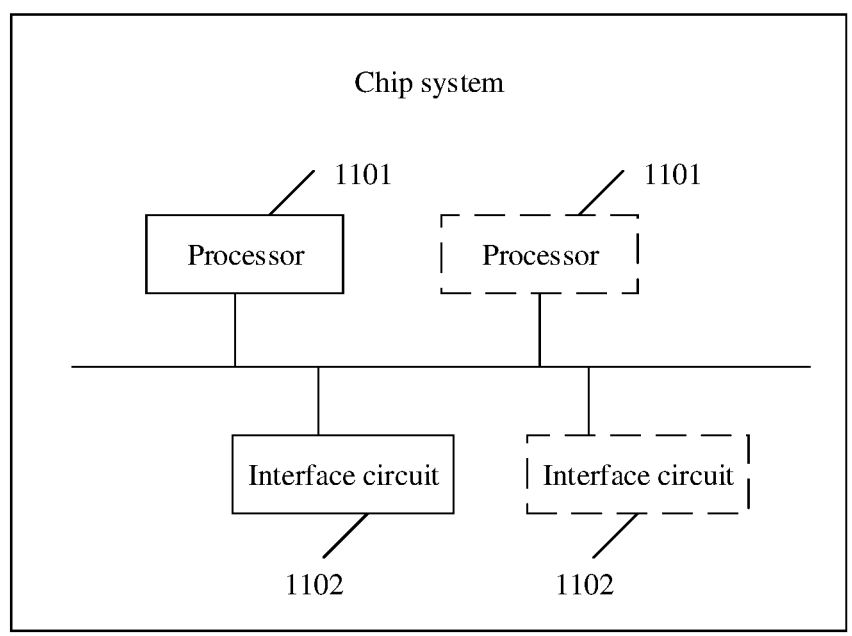
FIG. 11 is a schematic diagram of a structure of a chip system according to an embodiment of this application.

Embodiment 4 of this application provides a chip system. The chip system may be applied to the electronic device in the foregoing embodiment. As shown in FIG. 11, the chip system includes at least one processor 1101 and at least one interface circuit 1102. The processor 1101 may be a processor in the foregoing electronic device. The processor 1101 and the interface circuit 1102 may be interconnected through a line. The processor 1101 may receive computer instructions from a memory of the electronic device through the interface circuit 1102, and execute the computer instructions. When the computer instructions are executed by the processor 1101, the electronic device may be enabled to perform steps performed by the mobile phone in the foregoing embodiments. Certainly, the chip system may further include another discrete device. This is not specifically limited in this embodiment of this application.

Embodiment 5

Embodiment 5 of this application provides a computer-readable storage medium, configured to store computer instructions run by the foregoing electronic device (such as a mobile phone).

Embodiment 6

Embodiment 6 of this application provides a computer program product, including computer instructions run by the foregoing electronic device (such as a mobile phone).

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, in other words, may be located in one place, or may be distributed on a plurality of different places. Some or all of the units may be selected based on actual requirements to achieve the objectives of the solutions in embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The foregoing storage medium includes: any medium that can store program code, such as a USB flash drive, a removable hard disk, a read only memory (read only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A layout analysis method, wherein the method comprises:
    receiving a first operation performed by a user on a touchscreen of an electronic device, wherein the first operation triggers the electronic device to perform layout analysis;
    obtaining at least one region of interest (ROI) in response to the first operation;
    determining, based on content of a first interface currently displayed on the touchscreen of the electronic device, type and location information of each of a plurality of to-be-matched regions on the first interface;
    determining a degree of overlapping between the at least one ROI and each type of the plurality of to-be-matched regions located within the at least one ROI based on the at least one ROI, and the type and the location information of each of the plurality of to-be-matched regions, wherein at least a first one and a second one of the plurality of to-be-matched regions is a different type;
    determining a first service based on at least the degree of overlapping between the at least one ROI and each type of the plurality of to-be-matched regions;
    running the first service; and
    displaying a second interface on the touchscreen of the electronic device, wherein the second interface comprises a layout analysis result obtained after the first service is run, and wherein the first service is one of an optical character recognition service, a visual shopping service, a text translation service, or a QR code recognition service.

2. The method according to claim 1, wherein determining the first service based on at least the degree of overlapping between the at least one ROI and each type of the plurality of to-be-matched regions comprises:
    determining the first service based on a historical operation record and the degree of overlapping between the at least one ROI and each type of the plurality of to-be-matched regions, wherein the historical operation record comprises a second operation and a corresponding service selected by the user, and wherein the second operation is an operation that is received before the first operation is received and that triggers the electronic device to perform layout analysis.

3. The method according to claim 2, wherein the electronic device stores a prediction model, wherein the prediction model has a function of determining, based on a degree of overlapping between regions, a service that needs to be run, wherein the prediction model is updated based on the historical operation record, and wherein determining the first service based on the historical operation record and the degree of overlapping between the at least one ROI and each type of the plurality of to-be-matched regions comprises:
   determining, by the electronic device, the first service based on the degree of overlapping between the at least one ROI and each type of the plurality of to-be-matched regions as an input of the prediction model.

4. The method according to claim 1, wherein the electronic device stores a prediction model, wherein the prediction model has a function of determining, based on a degree of overlapping between regions, a service that needs to be run, and wherein determining the first service based on at least the degree of overlapping between the at least one ROI and each type of the plurality of to-be-matched regions comprises:
   determining, by the electronic device, the first service based on the degree of overlapping between the at least one ROI and each type of the plurality of to-be-matched regions as an input of the prediction model.

5. The method according to claim 1, wherein the at least one ROI comprises one or more of a first ROI, a second ROI, a third ROI, or a fourth ROI, and wherein:
   the first ROI is a region comprising a pressing position of the first operation;
   the second ROI is a central region of the first interface;
   the third ROI is an entire region of the first interface; and
   the fourth ROI is a region that accounts for a preset proportion of the first interface.

6. The method according to claim 5, wherein the at least one ROI comprises a first ROI, and wherein the region comprising the pressing position is a rectangular region.

7. The method according to claim 1, wherein determining, based on the content of the first interface currently displayed on the touchscreen of the electronic device, the type and location information of each of the plurality of to-be-matched regions on the first interface comprises:
   determining, by a server, the type and the location information of each of the plurality of to-be-matched regions on the first interface based on the content of the first interface analyzed with a neural network algorithm or an image content detection algorithm.

8. The method according to claim 1, wherein the type of each of the plurality of to-be-matched regions comprises one or more of a text region, an image region, or a QR code region.

9. The method according to claim 1, wherein determining the degree of overlapping between the at least one ROI and each type of the plurality of to-be-matched regions located within the at least one ROI based on the at least one ROI and the type and the location information of each of the plurality of to-be-matched regions comprises:
   determining a first intersection over union (IoU) of each of the plurality of to-be-matched regions and the at least one ROI based on the location information of each of the plurality of to-be-matched regions; and
   merging first IoUs of each of the plurality of to-be-matched regions that are of a same type and the at least one ROI based on the type of each of the plurality of to-be-matched regions, to obtain the degree of overlapping between the at least one ROI and each type of the plurality of to-be-matched regions.

10. The method according to claim 9, wherein determining the first IoU of each of the plurality of to-be-matched regions and the at least one ROI based on the location information of each of the plurality of to-be-matched regions comprises:
   determining a second IoU of each of the plurality of to-be-matched regions and the at least one ROI based on the location information of each of the plurality of to-be-matched regions;
   determining a distance between a center point of each of the plurality of to-be-matched regions and a center point of the at least one ROI based on the location information of each of the plurality of to-be-matched regions;
   normalizing the distance between the center point of each of the plurality of to-be-matched regions and the center point of the at least one ROI;
   obtaining an attenuation coefficient of each of the plurality of to-be-matched regions based on a normalized distance; and
   performing, for each of the plurality of to-be-matched regions, attenuation processing on the second IoU of the to-be-matched region and the at least one ROI by using the attenuation coefficient of the to-be-matched region to obtain the first IoU of each of the plurality of to-be-matched regions and the at least one ROI.

11. The method according to claim 3, wherein after displaying the second interface on the touchscreen of the electronic device, the method further comprises:
   receiving an operation of choosing, by the user, to use the first service; and
   using the first service and the degree of overlapping between the at least one ROI and each type of the plurality of to-be-matched regions as a first training sample; and
   updating the prediction model, based on the first training sample, so that the prediction model has a function of determining the first service based on the degree of overlapping between the at least one ROI and each type of the plurality of to-be-matched regions.

12. The method according to claim 3, wherein after displaying the second interface on the touchscreen of the electronic device, the method further comprises:
   receiving an operation of choosing, by the user, to use a second service, wherein the second service is one of the optical character recognition service, the visual shopping service, the text translation service, or the QR code recognition service, and wherein the second service is different from the first service;
   using the second service and the degree of overlapping between the at least one ROI and each type of the plurality of to-be-matched regions as a second training sample; and
   updating the prediction model, based on the second training sample, so that the prediction model has a function of determining the second service based on the degree of overlapping between the at least one ROI and each type of the plurality of to-be-matched regions.

13. The method according to claim 12, wherein the second interface further comprises an identifier of the second service, and wherein the receiving an operation of choosing, by the user, to use a second service comprises:
   receiving an operation performed by the user on the identifier of the second service.

14. An electronic device, wherein the electronic device comprises:
   a display comprising a touchscreen;
   one or more processors; and
   a non-transitory computer-readable storage medium storing a program to be executed by the one or more processors, the program including instructions for:

receiving a first operation performed by a user on a touchscreen of the electronic device, wherein the first operation triggers the electronic device to perform layout analysis;

obtaining at least one region of interest (ROI) in response to the first operation;

determining, based on content of a first interface currently displayed on the touchscreen of the electronic device, a type and location information of each of a plurality of to-be-matched regions on the first interface;

determining a degree of overlapping between the at least one ROI and each type of the plurality of to-be-matched regions located within the at least one ROI based on the at least one ROI, and the type and the location information of each of the plurality of to-be-matched regions, wherein at least a first one and a second one of the plurality of to-be-matched regions is a different type;

determining a first service based on at least the degree of overlapping between the at least one ROI and each type of the plurality of to-be-matched regions;

running the first service; and displaying a second interface on the touchscreen of the electronic device, wherein the second interface comprises a layout analysis result obtained after the first service is run, and wherein the first service is one of an optical character recognition service, a visual shopping service, a text translation service, or a QR code recognition service.

15. The electronic device according to claim 14, wherein the instructions further include instructions for:

determining the first service based on a historical operation record and the degree of overlapping between the at least one ROI and each type of the plurality of to-be-matched regions, wherein the historical operation record comprises a second operation and a corresponding service selected by the user, and wherein the second operation is an operation that is received before the first operation is received and that triggers the electronic device to perform layout analysis.

16. The electronic device according to claim 15, wherein the electronic device stores a prediction model, wherein the prediction model has a function of determining, based on a degree of overlapping between regions, a service that needs to be run, and wherein the prediction model is updated based on the historical operation record, and wherein the instructions for determining the first service based on the historical operation record and the degree of overlapping between the at least one ROI and each type of the plurality of to-be-matched regions comprise instructions for:

determining, by the electronic device, the first service by using the degree of overlapping between the at least one ROI and each type of the plurality of to-be-matched regions as an input of the prediction model.

17. The electronic device according to claim 15, wherein the electronic device stores a prediction model, wherein the prediction model has a function of determining, based on a degree of overlapping between regions, a service that needs to be run, and wherein the instructions further include instructions for:

determining, by the electronic device, the first service based on the degree of overlapping between the at least one ROI and each type of the plurality of to-be-matched regions as an input of the prediction model.

18. The electronic device according to claim 17, wherein the at least one ROI comprises one or more of a first ROI, a second ROI, a third ROI, or a fourth ROI, wherein:

the first ROI is a region comprising a pressing position of the first operation;

the second ROI is a central region of the first interface;

the third ROI is an entire region of the first interface; and the fourth ROI is a region that accounts for a preset proportion of the first interface.

19. The electronic device according to claim 18, wherein the at least one ROI comprises the first ROI, and wherein the region comprising the pressing position is a rectangular region.

20. A non-transitory computer-readable storage medium storing a program to be executed by one or more processors, the program including instructions for:

receiving a first operation performed by a user on a touchscreen of an electronic device, wherein the first operation triggers the electronic device to perform layout analysis;

obtaining at least one region of interest (ROI) in response to the first operation;

determining, based on content of a first interface currently displayed on the touchscreen of the electronic device, type and location information of each of a plurality of to-be-matched regions on the first interface;

determining a degree of overlapping between the at least one ROI and each type of the plurality of to-be-matched regions located within the at least one ROI based on the at least one ROI, and the type and the location information of each of the plurality of to-be-matched regions, wherein at least a first one and a second one of the plurality of to-be-matched regions is a different type;

determining a first service based on at least the degree of overlapping between the at least one ROI and each type of the plurality of to-be-matched regions;

running the first service; and displaying a second interface on the touchscreen of the electronic device, wherein the second interface comprises a layout analysis result obtained after the first service is run, and wherein the first service is one of an optical character recognition service, a visual shopping service, a text translation service, or a QR code recognition service.

* * * * *